United States Patent [19]

Sanner

[11] E Re. 31,204

[45] Reissued Apr. 12, 1983

[54] SPRINKLER FLOW CONTROL SYSTEMS

[76] Inventor: George E. Sanner, Cypress Hill, Sparks, Md. 21204

[21] Appl. No.: 24,685

[22] Filed: Mar. 28, 1979

Related U.S. Patent Documents

Reissue of:

[64] Patent No.: 4,014,359
Issued: Mar. 29, 1977
Appl. No.: 625,350
Filed: Oct. 23, 1975

U.S. Applications:

[60] Continuation-in-part of Ser. No. 466,693, May 3, 1974, which is a continuation-in-part of Ser. No. 272,793, Jun. 18, 1972, Pat. No. 3,848,616, which is a continuation-in-part of Ser. No. 18,829, Feb. 12, 1970, abandoned, which is a division of Ser. No. 456,787, May 18, 1965, Pat. No. 3,500,844.

[51] Int. Cl.[3] ..... A01G 25/16

[52] U.S. Cl. ..... 137/78.3; 137/356; 137/377; 137/624.15; 239/63; 239/70; 307/118; 340/602; 220/326

[58] Field of Search ..... 137/78 R, 78 A, 78 C, 137/78 D, 356, 377, 382, 624.11, 624.12, 624.13, 624.15, 624.16, 624.17; 248/219.2; 251/367; 239/63–67, 70; 200/61.04, 61.05; 307/118; 340/602; 220/324, 326

[56] References Cited

U.S. PATENT DOCUMENTS

| | | | |
|---|---|---|---|
| 1,119,968 | 12/1914 | Le Sieur | 220/324 |
| 1,300,712 | 4/1919 | Ferdon | 220/324 |
| 1,961,181 | 6/1934 | Der Heydt | 220/326 |
| 2,192,578 | 3/1940 | Michaels | 137/624.11 |
| 2,599,862 | 6/1952 | Ray | 137/78 |
| 2,754,150 | 7/1956 | Edelman | 137/78 X |
| 2,786,596 | 3/1957 | Claud-Mantle | 220/326 |
| 3,118,606 | 1/1964 | Rotunda | 137/78 X |
| 3,283,781 | 11/1966 | Boyer | 137/624.17 |
| 3,361,356 | 1/1968 | Johnson et al. | 137/78 |
| 3,407,997 | 10/1968 | Wood et al. | 248/145 X |
| 3,483,673 | 12/1969 | Wellman | 137/624.13 X |
| 3,500,844 | 3/1970 | Sanner | 137/78.2 |
| 3,672,391 | 6/1972 | Livingston et al. | 137/240 |
| 3,848,616 | 11/1974 | Sanner | 137/78.5 |
| 3,915,185 | 10/1975 | Sanner | 137/78 |

*Primary Examiner*—A. Michael Chambers
*Attorney, Agent, or Firm*—LeBlanc, Nolan, Shur & Nies

[57] ABSTRACT

Fluid flow control systems for lawn sprinkling flow control systems which include rain override means and continuously available rain alarm signals during rainfall. Provisions are provided to prevent valve flutter during light or intermittent rainfall by means of conventional time delay relays. A novel, simple, and economic hermetically sealed outdoor casing is provided. Use of unique remote transformer plug and cord insures consumer product safety compliance against electrical shock hazzard.

49 Claims, 17 Drawing Figures

SPRINKLER FLOW CONTROL SYSTEMS

Matter enclosed in heavy brackets [ ] appears in the original patent but forms no part of this reissue specification; matter printed in italics indicates the additions made by reissue.

This application is a continuation-in-part of application Ser. No. 466,693, filed May 3, 1974, which ws a continuation-in-part of application Ser. No. 272,793 filed June 18, 1972 (now U.S. Pat. No. 3,848,616). The latter is a continuation-in-part of application Ser. No. 18,829 filed Feb. 12, 1970 (now abandoned) which is a division of application Ser. No. 456,787 filed May 18, 1965 ( now U.S. Pat. No. 3,500,844).

The present invention relates to sprinkler flow control systems, and more specifically, and primarily to novel, improved, self contained fluid flow control units for lawn sprinkling and other outdoor lawn and garden applications.

This invention relates to control systems and, primarily, to systems for automatically controlling the operation of lawn sprinklers; although, the invention disclosed herein may be used for other purposes as well.

Numerous automatically controlled lawn sprinkler systems have heretofore been proposed. A major disadvantage of many of these is that no provision is made for turning off the sprinklers during periods of natural rainfall. Consequently, such systems waste water and, in addition, may overwater and damage the grass of lawns where such systems are employed.

This problem has heretofore been recognized, and several attempts have been made to solve it as is shown by U.S. Pats. Nos. 2,284,158, 2,318,969, 3,063,643, and 3,140,720. These disclose automatic controlled lawn sprinkling systems in which provision is made for shutting off the sprinklers when it begins to rain. However, the systems of this type, heretofore known, have a number of disadvantages. First, they often employ a mechanical arrangement; such as, a float-operated switch for shutting off the sprinklers, which is complex, expensive, bulky, less reliable, and more difficult to adjust than is desirable. Second, these prior systems have an undesirably long reaction time. Third, some of the prior art systems must be manually reset after the rain ceases by draining a rain collecting container. In the others, resetting of the system involves the evaporation of collected moisture from a container, which takes an undesirably long period of time.

Other types of control units for lawn sprinkling and comparable fluid flow systems also include a mechanical timer and a valve housed in an appropriate casing provided with connections for fluid inflow and outflow conduits. Exemplary control units of this character are disclosed in U.S. Pats. No. 1,085,012 issued Jan. 20, 1914, to Bopp; U.S. Pat. No. 1,179,863 issued Apr. 18, 1916, to Phillips; U.S. Pat. No. 1,484,126 issued Feb. 19, 1924, to Gaspard; U.S. Pat. No. 1.929,455 issued Oct. 10, 1933, to Smith; U.S. Pat. No. 2,629,437 issued Feb. 24, 1953, to Weeks; U.S. Pat. No. 2,719,538 issued Oct. 4, 1955, to Cole; U.S. Pat. No. 2,768,683 issued Oct. 20, 1956, to DeSchane; and U.S. Pat. No. 2,852,072 issued Sept. 16, 1958, to Alfrey.

The last four of the patents disclose control units of the currently marketed, so-called "waterboy" type. The control unit is attached directly to a faucet and connected by a hose to a sprinkler. The mechanical timer of the unit is set, opening the control unit valve, and the faucet opened. Water flows to the sprinkler until the timer runs down (usually 30–90 minutes). The control unit valve then closes and remains so until the timer is manually reset.

Control units of the type just described have a number of disadvantages.

One of these is that the timer must be manually reset for each flow control cycle.

Also, this type of control lacks versatility. The period over which the timer can exercise control is limited; and, more important, such units cannot be provided with auxiliary controls.

For example, it is often desirable to make provision in a lawn sprinkling system for interrupting the sprinkling during periods of rainfall. Modification of a mechanical timer to function in this manner is impractical economically if not technically.

Also, control units of the character just described are not capable of being modified to control remotely located options such as flow control valves, pumps, etc.

Another disadvantage of fluid flow control units with mechanical timers is that the dust and moisture encountered in outdoor operation can cause failures or unreliable operation.

Fluid flow system controls with electric, clock-type timers have also been proposed. Representative controllers of this type are disclosed in U.S. Pats. No. 2,599,862 issued June 10, 1952, to Ray; U.S. Pat. No. 2,754,150 issued July 10, 1956, to Edelman; U.S. Pat. No. 2,864,650 issued Dec. 16, 1958, to Delamater; and U.S. Pat. No. 3,212,714 issued Oct. 19, 1965, to Davis.

These controllers have the advantage over mechanical timed controllers that the timing cycle is automatically repetitive. Therefore, the timer need not be reset for each watering or other flow cycle. However, the controllers with electric, clock-type timers heretofore proposed have disadvantages which are equally, if not more, serious than those appurtenant to controllers with mechanical timers.

As shown by the patents last mentioned above, flow system controllers with electrically-operated timers as heretofore envisioned typically include, in addition to the unit in which the timer is housed, a remotely disposed solenoid valve and a control device; such as, a soil moisture probe or a rain switch. The solenoid valve and the control device are both connected by external electrical lines to the timer unit which is connected, also by external conductors, to an electrical power source.

Two additional examples of these types of controllers are U.S. Pat. No. 3,118,606 issued on Jan. 21, 1964 to Rotunda, and U.S. Pat. No. 3,207,866 issued on Sept. 21, 1965 to Hicks.

One of the more important advantages of my invention is that it provides an economic, practical, and quickly installable automatic lawn sprinkler control system that is equally adaptable to both above ground and underground home type lawn sprinkler systems. It provides a means for the average homeowner to economically sprinkle residential lots of the order of ½-3 acres using commercially available above ground garden hoses and lawn sprinklers of the rotary, impact, and wave variety.

Another important advantage of the novel invention is that it can be economically packaged for inside installation wherein conventional plumbing is extended to the home exterior where conventional garden hoses and sprinklers are attached, or it may be economically hermetically packaged for outside installation either on a semi-portable stanchion or directly on the outlet of a conventional faucet. Further, the invention permits permanent inside installation in conjunction with outside semi-portable auxiliary above ground control valves.

Another important objective of the present invention is to provide the residential homeowner with a simple lawn sprinkling system that can provide sprinkling time intervals as short as 10–15 minutes or as extensive as 2–6 hours in order to provide complete sprinkling flexibility in consonance with vegetation requirements, local water pressure, and individual home plumbing criterion. Additionally, because of the increase value of water it is necessary that automatic lawn sprinkling be accomplished only on certain designated days and many local municipality laws require that lawn sprinkling be accomplished strictly on those days. Therefore, means must be provided to enable automatic sprinkling on certain predetermined days; such as, every other day, every third day, or on given combinations of days.

Another important objective of the present invention is to provide a simple electrical manual override switch that turns the lawn sprinkler on and off without interferring with the operation of the timer clock and provides manual operation that is independent of the clock cycle and of the rainfall status.

It is another important object of the present invention to provide novel, improved automatic lawn sprinkler systems which are capable of shutting off the sprinklers during periods of natural rainfall, but do not have the disadvantages of previously known systems of this type.

In general, the novel lawn sprinkling systems provided by the present invention are characterized by one or more electromagnetically controlled valves in series with an electric timer-operated switch and a non-resistive rain-operated switch. The timer is set for a given interval of time depending upon the locality, annual rainfall, type of vegetation being irrigated, etc. At a given time within each 24 hour interval, the timer closes the timer-operated switch, the electromagnetic valve (or valves) opens, and sprinkling occurs. However, if natural rainfall occurs while the flow control valve is open, the rain switch closes; and, sprinkling ceases while the natural rainfall continues.

If the natural rainfall continues beyond the end of the present increment of time, the sprinkler does not resume operation until the 24 hour period has elapsed. However, if the natural rainfall ends before completion of the preset time increment, the main switch opens; and, sprinkling is resumed. In this manner, lawns may be provided with automatic irrigation for a preselected portion of each 24 hour period, the irrigation consisting of artifical rainfall or natural rainfall, or a combination of both.

Another important objective of the present invention is to prevent sprinkler valve "flutter" during intermittant rainfall or when rainfall first begins, due to intermittant opening and closing of the rain switch; while still retaining sprinkler operation that is coterminous with rainfall.

Another important objective of the present invention is to provide a rain alarm that will signal when rainfall begins and is completely independent of the sprinkler's operation. This alarm is remotely mounted and, in this novel circuit, provides full utilization of the sprinkler control at negligent additional manuafacturing cost.

Another objective of the present invention is to provide an outdoor sprinkler control that is hermetically sealed. During past years, while it has been assumed that hermatically sealed sprinkler controls are an obvious extension of non-weatherproof models, the successful introduction of practical outdoor controls has not borne out this concept. Further, increasing importance placed on safety (particularly in connection with outdoor electrified appliances) has been brought clearly into focus by the passage of the U.S. Consumer Product Safety Act. This resulting establishment of the U.S. Consumer Safety Commission now requires that manufacturers develop consumer products both from the standpoint of economic manufacturability and consumer user safety. Accordingly, this is probably the most novel and important feature of the subject invention. A unique gasket sealing arrangement is provided that enables two degrees of hermetic sealing; one for encasing interior electrified components, and a second degree for panel controls. For example, if the consumer user should forget to close the cover of the novel control, environmental protection of the electrified components is insured and electrical shock hazzard is avoided. At the same time, the novel arrangement, of the inexpensive casing component, makes the unique control economically manufacturable.

Another important objective of the present invention is to provide an outdoor hermetically sealed sprinkler control that is safe from electrical shock hazzard and is, also, economically attractive for manufacturing. During the last decade great effort has been placed upon the development of ground-fault circuit-interrupters which sense line current balance-to-ground and automatically interrupt a circuit; thereby, protecting the circuit user from electrical shock, should a short to ground cause such a circuit imbalance. Manufacturing economics, in conjunction with operational complexity, however, have resulted in their consumer accpetance being less than effective.

A novel, practical, and economic approach is disclosed in the present invention which has its most desirable feature in its simplicity and operational reliability. A novel, 3-wire, grounded plug is provided and reduces line voltage to 12 to 24 volts within the unique plug; wherein, a grounded-barrier constant-energy stepdown transformer is utilized. Cooling fins on the outer surface of the plug make possible this unique invention. In this arrangement, only low voltage is available between the plug and the lawn sprinklers. Additionally, use of a dead-front type plug and a low durometer seal insures a plug-to-outdoor-receptacle hermetic seal.

Another important advantage of the present invention is a simple means for attaching the hermetically sealed casing directly to a conventional faucet outlet and connecting to the sprinkler control one or two garden hoses, and associated sprinklers; thus, providing an automatic sprinkler system that requires no installation. This portable unit is then simply plugged into a conventional electrical outlet receptacle. The rain-switch housing a tiltable to insure its correct inclination for various faucet outlet angles.

In their simplest versions, my novel sprinkler flow control systems include a casing in which a solenoid-operated valve, and all of the controls essential for the operation of the valve, can be housed. The only connections to the unit include: a power cord for connecting the electrical components of the unit to a power source; fluid inlet and outlet connections; optional, circuit connections for auxiliary control devices responsive to parameters such as precipitation, pressure, and humidity level; and, for other flow controlling and/or effecting devices, such as, pumps and remotely located valves.

One of the important advantages of the controllers just described is that all of the electrical components necessary for flow control can be integrated into a single portable unit with only one external electrical connection.

This makes the system compact. And it can be readily moved from place to place and installed when and where it is needed.

The control system is simple and inexpensive to manufacture. Installation can be accomplished quickly and without special skills or tools as this typically involves only connecting hoses to the fluid couplings of the unit and plugging its power cable into a socket or jack.

Another important advantage of my novel flow control as described above, is that by requiring only one external electrical line, it poses less of a safety problem, both during installation and operation. This line can be very short if the control is located near an outlet or other electrical power source. This virtually eliminates the electrical shock hazard.

The entire control unit hermetically sealed, together with the simplicity of the system, makes the unit exceptionally reliable. The hermetically sealed casing also contributes to the low cost of the system as it renders unnecessary the use of shields, and the like, to protect the components of the unit against dust and moisture.

Another important advantage of the control units I have invented is their versatility. Auxiliary control devices; such as, soil moisture detectors, rain switches, booster pumps, and additional solenoid-operated valves, can be added by plugging them into sockets or jacks opening onto the exterior of the control unit casing. No acess to the interior of the control unit casing is required which will be appreciated as a decided benefit by those conversant in the arts to which the present invention relates.

Another important advantage of my novel control units is that the operating cycle is repetitive. This makes them superior to those which have mechanical timers and must accordingly be manually reset after each operating cycle.

The feature just discussed, also, distinguishes my novel units from flow control systems shown in U.S. Pat. No. 2,651,361 issued Sept. 8, 1953, to Smith. Smith's controller employs a one-shot timer that requires resetting between operating cycles. Also, the Smith mechanism is too complex for the applications for which my novel control units are intended; and, it lacks the versatility of my flow controls in that the addition of auxiliary control and flow devices to the illustrated system would be impractical.

From the foregoing, it will be apparent to the reader that one important object of the invention resides in the provision of novel, improved apparatus for controlling flow in lawn sprinkling and other fluid flow systems.

Other important but more specific objects of the invention reside in the provision of sprinkler flow control systems.

1. which are adaptable to both above and below ground sprinkler systems;

2. which can be adapted for indoor or outdoor installation;

3. which automatically operate on a repetitive cycle, daily or on a preselected combination of days;

4. which will not operate during rainfall if rain occurs during the automatic operate time interval;

5. which will resume sprinkling if rainfall stops during the operate time interval;

6. which will not permit lawn sprinkler to flutter on and off during light rainfall but will provide control coterminously with rainfall;

7. which provide manual sprinkler override control;

8. which provide a simple reliable rain alarm;

9. which provide an outdoor hermetically sealed casing that is electrical shock hazzard proof;

10. which provide an electrical plug that is air cooled;

11. which provide a casing unit that is attachable to and is supported by a conventional outdoor water faucet;

12. which are simple and compact and are of a unitary construction, all of the components being housed in a single casing which can be hermetically sealed to keep foreign substances out;

13. which are portable and can be readily moved from place to place;

14. which are comparatively inexpensive to manufacture;

15. which are highly reliable in operation;

16. which can be installed easily, quickly, and without the exercise of special skills or the use of special tools;

17. which are safe to operate and to install;

18. which, in conjunction with the preceding object, are characterized by a minimum of exposed electrical lines;

19. which have a high degree of versatility;

20. in which, in conjunction with the preceding object, provision is made for easily and quickly adding auxiliary flow and/or control devices to the basic controls; and, 21. which have various combinations of the foregoing attributes.

Other important objects, features, and additional advantages of the invention will become apparent from the appended claims and as the ensuing detailed description and discussion proceeds in conjunction with the accompanying drawing, in which FIG. 1 is a somewhat pictorial illustration of a sprinkler flow control system in accord with the principles of the present invention;

Figure 1:
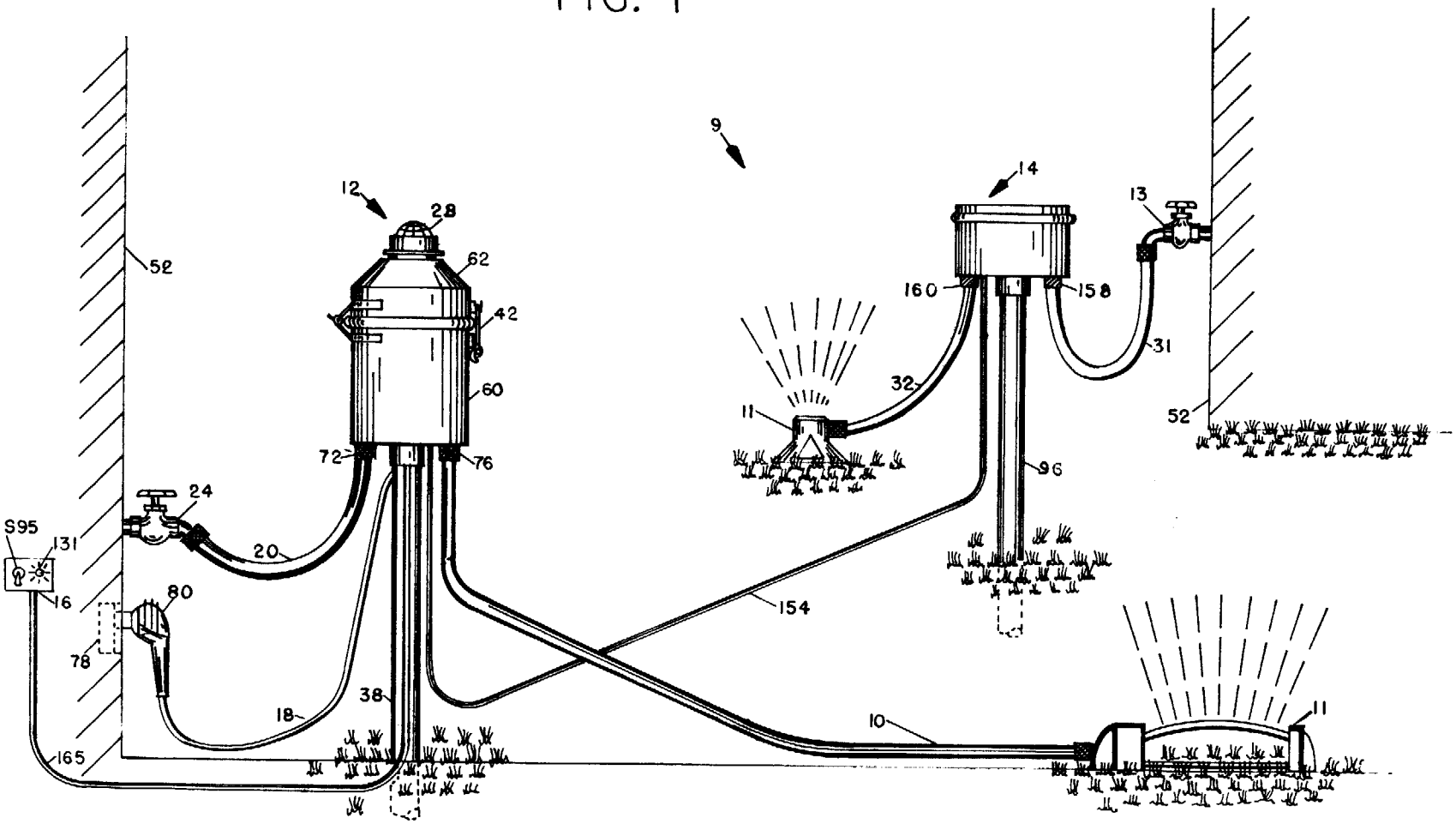
Figure 2:
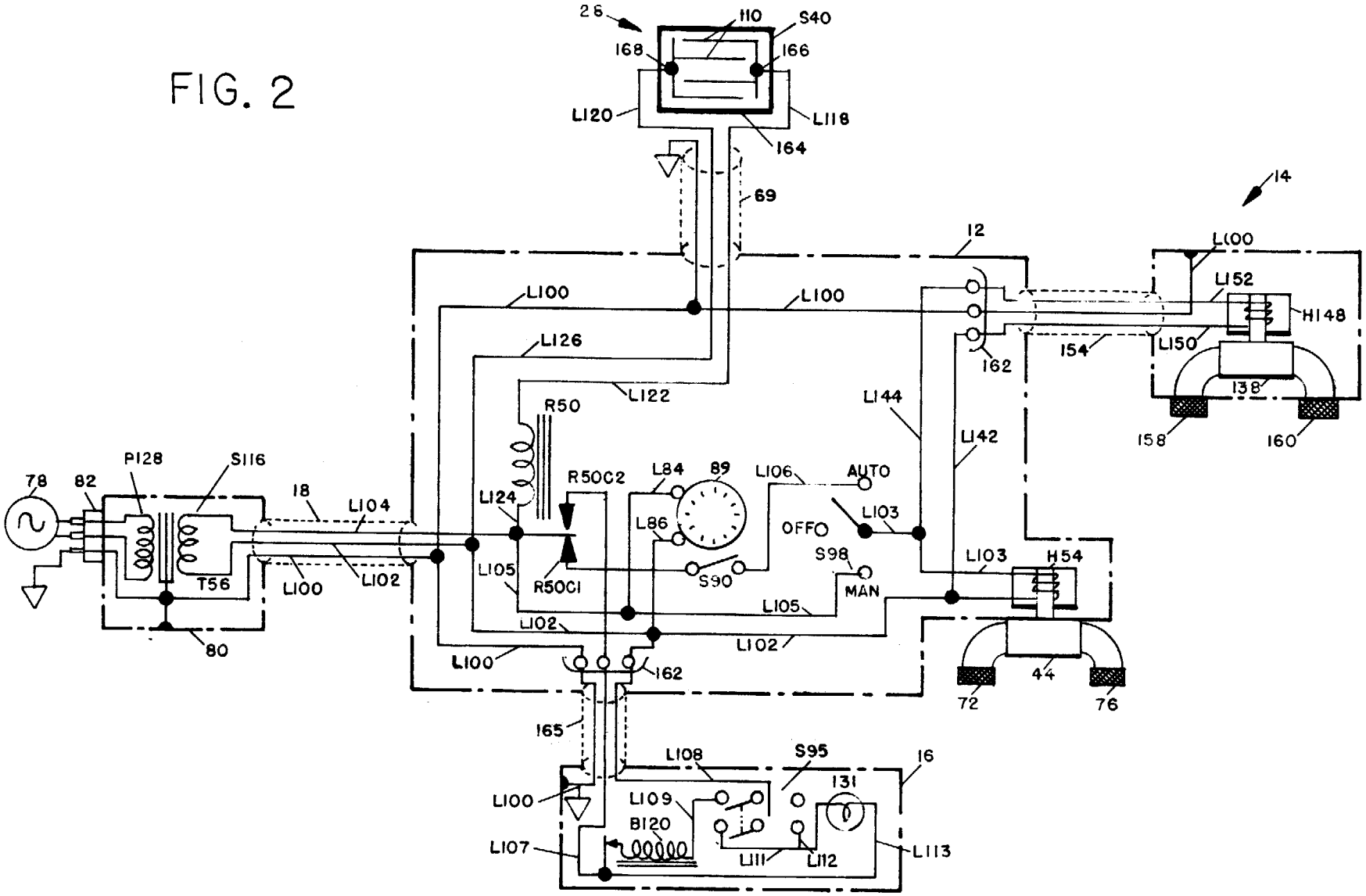
FIG. 2 is a schematic diagram of the sprinkler flow control system of FIG. 1.

Referring now to the drawing, FIGS. 1 and 2 disclose a sprinkler control system 9 in accord with the principles of the present invention, including a master control unit 12 for automatically controlling the flow of liquid through the flexible conduit 10 and from the lawn sprinker 11.

The typical lawn sprinkler flow control system includes a flow control 12 with an electrically actuated flow valve 44 controlling fluid flow in the distribution system; comprising water faucet 24, flexible flow conduits 10 and 20, and lawn sprinkler 11. As shown in FIGS. 1 and 2, the typical lawn sprinkler flow control system may include an auxiliary outdoor valve 14 that contains an electrical actuated valve 138 connected to the flow control by means of cable 154. The auxiliary outdoor valve 14, may receive fluid from a second outdoor faucet 13 through flexible fluid conduit 31 and may provide lawn irrigation may means of a second sprinkler 11 connected; thereto, by flexible fluid conduit 32. Flexible fluid conduits are attached by fittings 158 and 160.

It is understood that both fluid conduits 10 and 32 may each be connected to 2 or more sprinkler heads 11 by means of conventional fluid fitting "T"'s inserted in flexible fluid lines 10 and 32.

The flow control 12 causes flow valves 44 and 138 to open and close; thus, controlling the emission of fluid from sprinklers 11. As shown in FIG. 2, the electrical actuator H148 of value 138 is connected in parallel with the electrical actuator H54 of valve 44; thereby, operating concurrently in unison. Electrical power for flow control 12 is provided from a conventional exterior 105–125 volt, 60 cycle AC, outdoor electrical duplex receptacle 78, into which is plugged the unique extension power plug 80, which is connected to flow control 12 by a 3-wire grounded extension cable 18.

Figure 6:
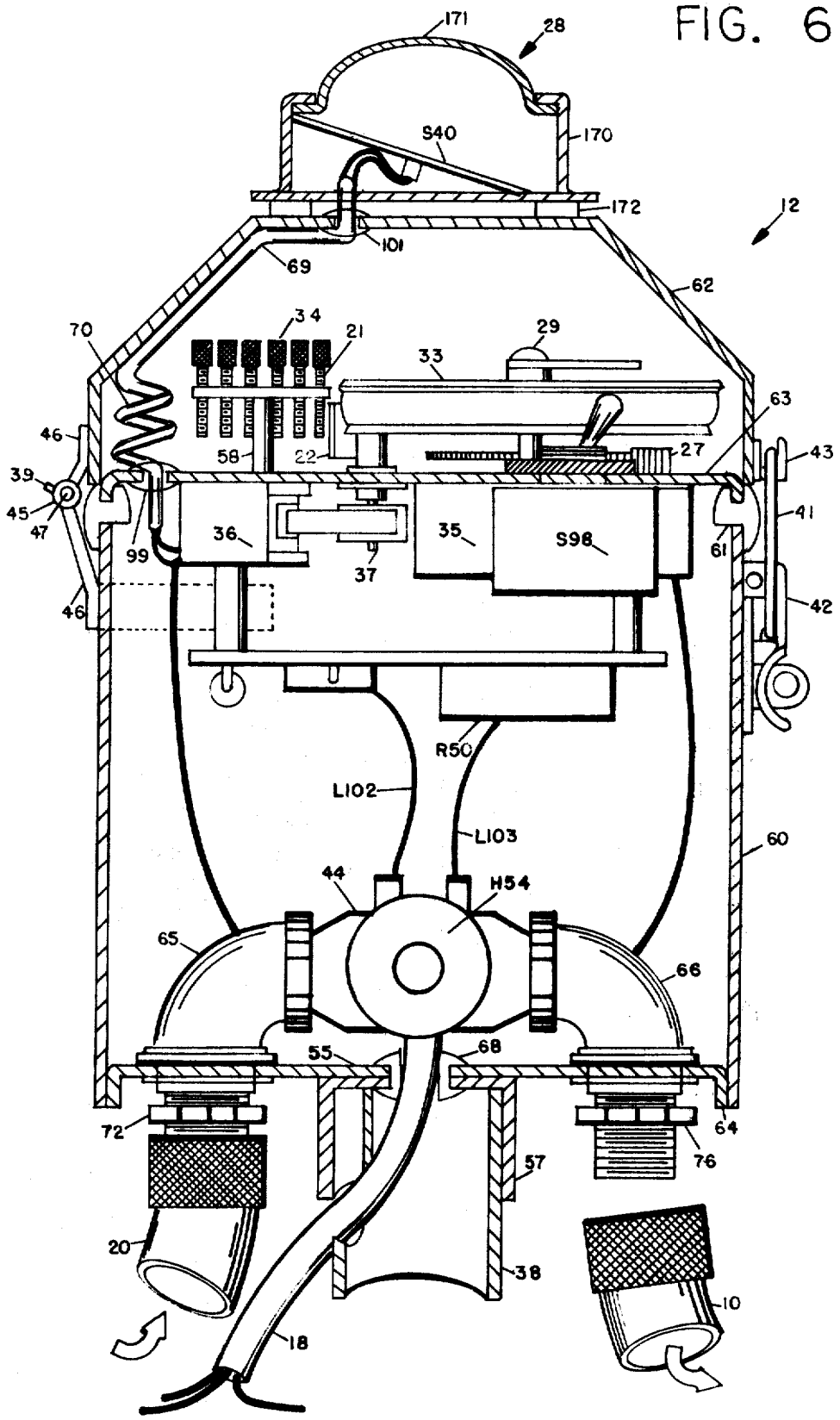
FIG. 6 is an elevation of a sprinkler flow control in accord with the principles of the present invention, the casing of the unit being broken away to show its internal components.

Both flow control 12 and auxiliary outdoor valve 14 are supported on tubular vertical stanchions 38 and 96 respectively and respective control cables 18 and 154 may be terminated into the casings of the control units, either by use of hermetic strain reliefs 87 (see FIGS. 9 and 13) or by insertion through the tubular stanchion into the units (see FIG. 6). Bottom plates of both units are provided with 2 cord holes, and one hermetic hole plug 129 (see FIG. 9) is provided, thereby, enabling the same manufacturing assembly line to produce flow units adapted with extension cords or without such cables intending the latter units for permanent wiring using the upper extremity of the vertical stanchion as a wiring connector box (see FIG. 14). Additionally, extension cables 18 and 154 may be connected to control units 12 and 14 respectively, by means of a slotted hole in stanchions 38 and/or 96 (see FIG. 6); thereby, enabling manufacture of control units having only one extension cable hole in the bottom plate thereof. In this manner, the control unit may be wired with a flexible extension cord 18 or permanently wired with wires 97 (see FIG. 14) located inside the vertical stanchion 38 or 96. For example, wires 154, of FIG. 2, could be placed into stanchion 96, of FIG. 1.

Also, shown in FIGS. 1 and 2, remote audiovisual rain alarm 16 audibly and visually signals during rainfall. Incorporated into the alarm is a three position switch S 95 which selects audiovisual alarm, visual alarm only, or no alarm, in accordance with the desires of the user. Remote rain alarm 16 is connected to flow control 12 by wiring cable 165.

It is understood that the audiovisual alarm 16 may as well be incorporated in the flow control 12, and that a combination of local and remote alarms may be provided. The flow control 12 is mechanized so that when power plug 80 is energized, rain alarm capability is provided, independent of other operational features and requirements of flow control 12. The rain alarm will operate independently of sprinkler operation.

Flow control 12 comprises a lower casing 60 and a cover lid 62 that contain a timer clock 89, an electrically actuated fluid valve 44, and fluid conduit connectors 72 and 76 for attaching inlet and outlet flexible fluid conduits 10 and 20 respectively. The timer switch contact S90 is mechanized to cause the fluid valve 44 to open and close during one or more contiguous or non-contiguous 15 minute time intervals during each 24 hour daily period. Additionally, one or more contiguous or non-contiguous days may be skipped; thus, providing for lawn sprikling on certain days, or combination of days, prescribed by local law in areas afflicted with water shortages.

Figure 4:
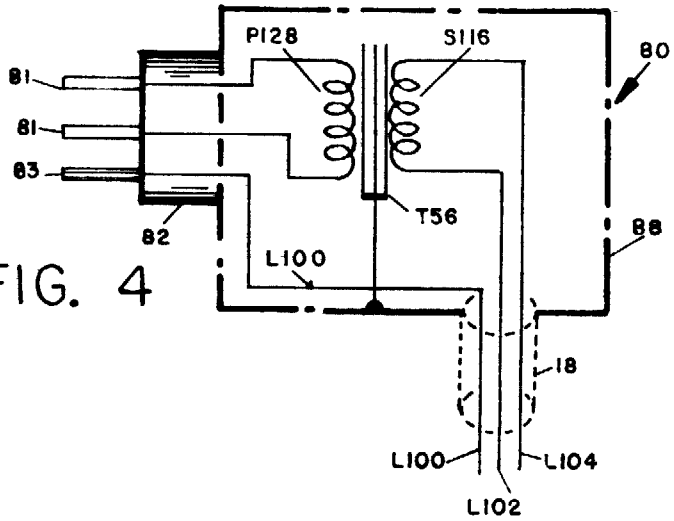
FIG. 4 is a schematic diagram of the extension plug of FIG. 3.
Figure 3:
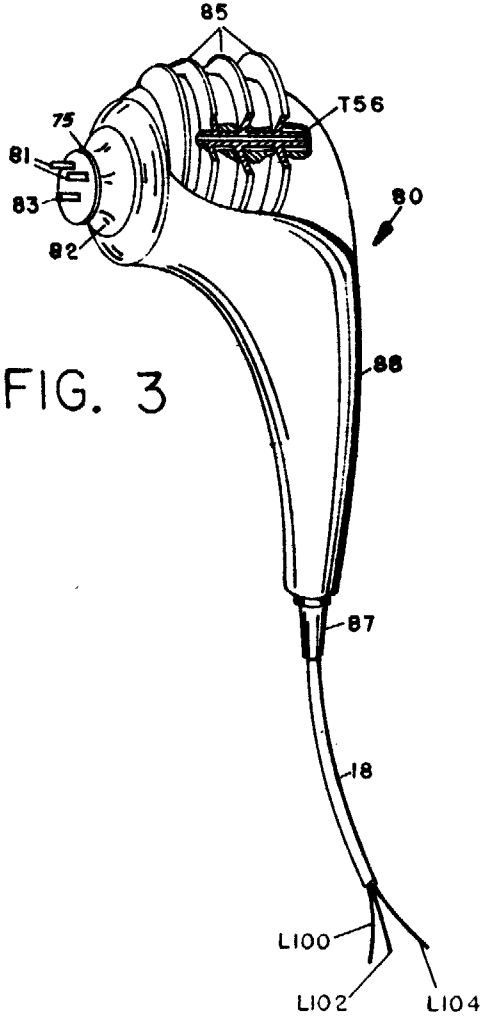
FIG. 3 is a somewhat pictorial illustration of the extension plug which provides the grounded-barrier constant energy source of operating voltage in accord with the principles of the present invention.

Referring now to FIG. 3, a low voltage power source, for operation of control unit 12 is provided by power plug 80 which comprises a casing 88, a dead-front 3-wire grounded connector 82 containing contact pins 81 and grounded pin 83, grounded 3-wire extension cable terminate in plug casing 88 by strain relief 87, and within plug 80 a stepdown transformer T56, the casing of which, is of unitary construction in combination with plug casing 88. The transformer frame lamination is extended through the insulated plug casing 88 to form cooling fins 85. In order to achieve protection from overheating, in conjunction with the cooling fins 85, a class II, energy-limited, transformer is incorporated. For example, if extension cable 18 were inadvertently severed, while plugged into power source 78, (see FIG. 1) causing conductors L102 and L104 to contact, this unique power plug would not cause a first or electrical shock hazzard because of the novel combination of both the transformers energy-limiting characteristic and utilization of the exterior cooling fins. Thermal energy generated in the interior of plug 80 flows along cooling fins 85 and is radiated into the atmosphere therefrom. In addition, the metallic construction of the conventional electrical outlet 78 is also utilized to conduct generated heat away from the isothermal interior environment of power plug 80. Referring now to FIG. 4, the ground pin 83 is electrically and thermally connected to power plug 80, casing 88, which is also an integral part of the laminated transformer coil core frame. During continuous operation of the tranformer, heat is generated and is further conducted via grounding pin 83, to electrical outlet box 78 which is also connected to attached structure 52 (shown in FIG. 1) which serves as a thermal heat sink.

Since the rain alarm 16 (see FIGS. 1 and 2) requires continuous residual operation of transformer T56, the above unique arrangement is required for the operation of the sprinkler control because absolute hermetic sealing of the power plug 80 is required, due to its continuous outdoor use. Additionally, an inspection of FIGS. 2, 5, and 7, reveal that power consumed from transformer T56, secondary S116, is limited to that required to operate timer motor 35, except during actual lawn sprinkling and/or rain alarm activated operations. This fact, in conjunction with the energy-limiting transformer, results in a unique sprinkler control in which available consumer electrical energy is conserved.

Figure 5:
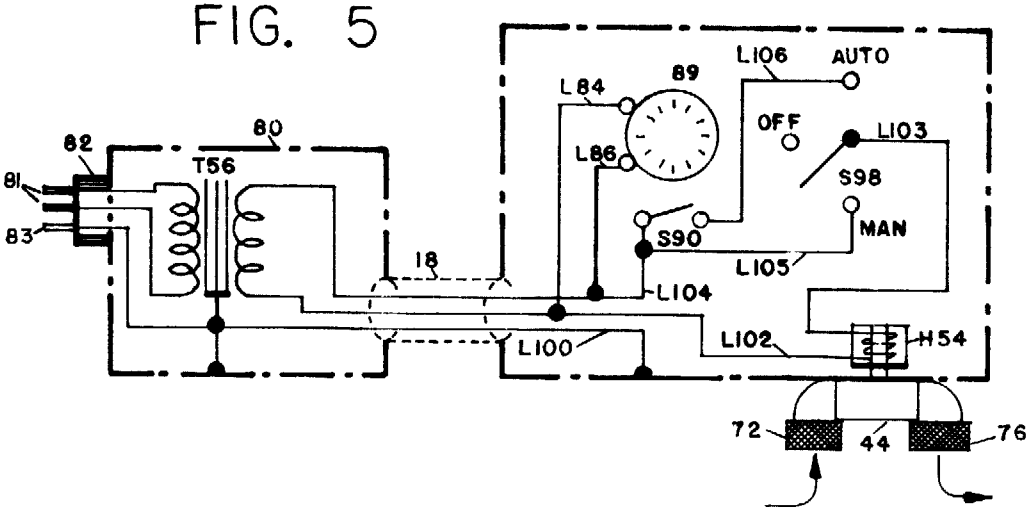
FIG. 5 shows an alternate valve operating control arrangement for sprinkler controls in accord with the principles of the present invention.

Referring now to FIGS. 4 and 5, a source of electrical voltage of value 105–125 volts, 60 yss, is connected to pins 81 of dead-front connector 82; to which, pins are also connected the primary winding P128 of stepdown transformer T56; and, secondary winding S116 thereof, provides a source of low operating voltage to cable 18 conductors L102 and L104. Dead-front connector ground pin 83 is connected to plug casing 88, and said casing may be of double insulation to further insure protection from electrical shock hazzard. Finally, transformer T56 may also contain a metallic, electrically, conductive barrier between the primary coil P128 and secondary coil S116, which barrier is electrically grounded to the power plug case; thereby, absolutely preventing electrical shock due to transformer winding break-down. When comparing this novel arrangement with ground-fault circuit-interrupter (G.F.C.I.) devices, that are intended to provide the same protection, this power plug's operational simplicity, reliability, and superiority is very evident. Additionally, the said power plug can be manufactured for a fraction of the cost of comparable G.F.C.I. equipments. Finally, because of the low cost of the power plug, shown in FIGS. 3 and 4, it is economically feasible to provide this electrical shock protection to each manufactured unit rather than restricting its application to installation in electrical outlet receptacles as in the case of currently available G.F.C.I. protective device. As required by provisions of the National Electrical Code, and for manufacture's protection from ever increasing consumer public liability, in view of U.S. consumer safety acts, such electrical shock protective means are absolutely essential. Therefore, the means herein invented provide an economically practical arrangement that is superior to other currently available art.

Figure 7:
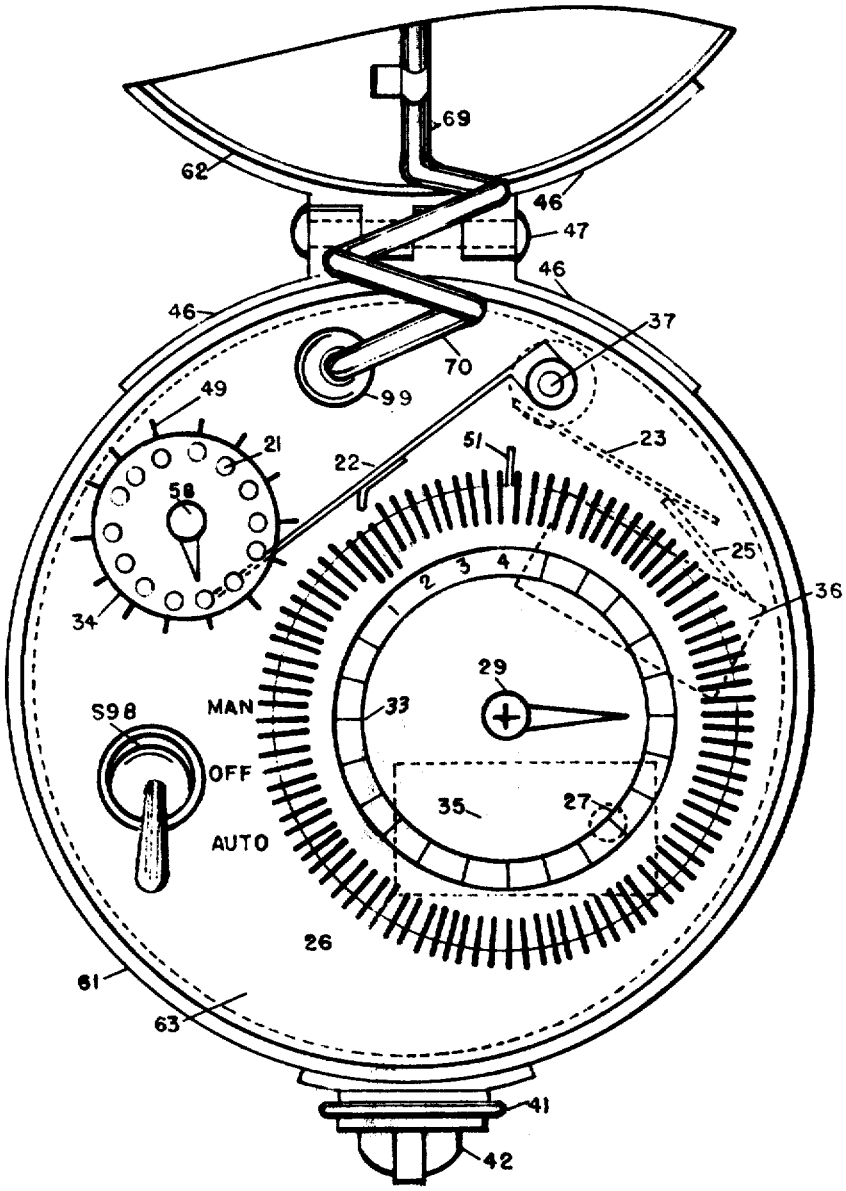
FIG. 7 is a somewhat pictorial illustrated plan view of the operating control panel in accord with the principles of the present invention, showing clock timer and mode switch.

Referring now to FIGS. 5 and 7, sprinkler flow control is shown, that simply illustrates the operation of the intended invention. Low voltage is provided on leads L104 and L102 through cable 18, through inner timer switch contact S90, to valve 44 solenoid coil H54, connected in series with mode selector switch S98. When mode selector switch S98 is in "automatic" position, the valve actuator H54 is energized via L104, S90, L106, L103, through coil H54 to L102; in which mode, valve 44 will open and close as clock driven switch contact S90 opens and closes. Electrical clock driving means 35 are energized from the source of low operating voltage via conductors L102, L104, via connecting conductors L84. and L86. If mode switch S98 is manipulated into its "off" position, it is obvious that valve solenoid H54 will be inoperative independently of all circuit means, since in "off" position all switch contacts are disconnected. When mode switch S98 is manipulated into its "manual" position, valve solenoid H54 is connected to low operating voltage source conductor L102 and to conductor L104 via L103, mode switch contact, and L105; thus, bypassing clock timer switch contact S90. Obviously, immediately upon switching to "manual" position, valve 44 will open and remain open independently of clock timer 89.

Referring to FIGS. 1 and 6, the flow control 12 is housed in a casing comprising a lower main casing 60 which is a section of cylindrical electric welded steel tubing, into the bottom end, of which, is attached a bottom cover or plate 55 and onto the top end, of which, is placed a flanged control panel 63 of inside and outside flange diameters that are equivalent to corresponding inside and outside diameters of main casing cylinder 60. Connecting the control panel 63 flange and the upper peripheral extremity of main casing 60 is an annular gasket 61 of "H" type cross section; wherein, the lower inside leg of the "H" type cross section is absent. This enables the flange of control panel 63 to be peripherally inserted into the gasket and the remaining outer peripheral gasket 61 lip to be telescoped over the upper peripheral edge of casing 60, as shown in FIG. 6. Panel 63 is pulled, by means of appropriate fasteners, (not shown) into a circumferential heremetic seal against the main casing 60.

Figure 8:
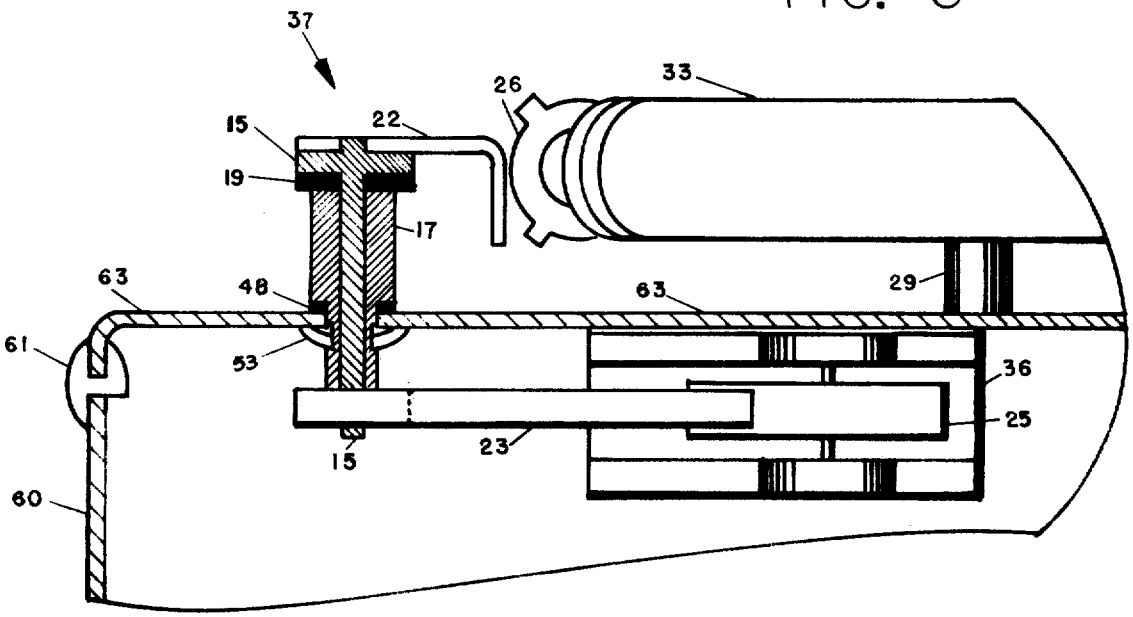
FIG. 8 is a partial elevation of the operating control panel in accord with the principles of the present invention showing the hermetically sealed pivot that actuates the clock switch.

Referring to FIGS. 6 and 7, the clock timer 89 is supported on the top and bottom faces of control panel 63. FIG. 7 shows a plan view of clock timer 89 attached to the top face of control panel 63. Shown in broken line configuration are those clock 89 elements attached to the bottom or interior surface of control panel 63. In this novel configuration, all electrified components of clock timer 89, including a spring tensioned time switch 36 and timer drive motor 35, are attached on the bottom of control panel 63, within the hermetically sealed interior of control casing 60. A combined 24 hour time wheel and clock face 33, along with its support post bearing 29, are supported on the top, or exterior, surface of control panel 63. Also, supported thereon are, 14 day time wheel 34 and its support post bearing 58, timer actuator lever 22, and tubular bushing assembly 37, which extends through control panel 63. Referring to FIGS. 7 and 8, timer actuator level 22 is mechanically connected to shaft 15 which extends through the tubular bearing 17. As shown in FIG. 8, vertical shaft 15 may pivot within concentric tubular bearing 17 in accordance with angular movement of radially connected timer actuator arm 22. Also, tubular bearing 17 is hermetically sealed to panel 63 exterior surface by annular seal 48. A concentric cup like seal 19 is used to provide a hermetic seal between tubular bearing 17 and pivot shaft 15. Also, tubular bearing 17 has a concentric slot undercut into which is inserted a beveled snap ring 53, that grips tubular pivot 17 and simultaneously bears forcefully against the bottom surface of control plane; thereby, compressing seal 48. Attached to shaft 15 by an offset bushing is switch actuator lever 23 which contacts spring tensioned clock switch 36, actuator arm 25. Accordingly, angular movement of the timer actuator arm 22, located on the exterior surface of panel 63, will cause, through hermetically sealed bearing 37 and switch actuator arm 23, the spring tensioned switch 36 to open and close.

FIG. 7 shows a somewhat conventional timer, and spaced around the periphery of this time wheel/clock face 33, are 96 concentric flip tabs 26, that, are partially rotatable radially such that when "flipped" towards the timing wheel center 29; timer actuator level 22 may rotate somewhat counterclockwise about pivot shaft 37; thereby, causing switch actuator level 23 to close switch 36. Accordingly, clock desired timing interval, may be selected in 15 minute intervals, simply by "rotating" individual tabs 26 about their axis radially clockwise towards time wheel 33 center post 29. In FIG. 7, a 45 minute time interval is shown set on time wheel 33 between 1 and 2 oclock.

Located adjacent to and overhanging end to timer actuator level 22 is a somewhat conventional 14 day wheel 34 supported on support post bearing 58 and comprising 14 teeth 49 and 14 mechanically actuated tabs 21 which, when depressed, prevent timer actuator lever 22 from closing timer switch 36, even though time interval tabs 26 are favorably so adjusted. Accordingly, to set timer clock 89 to skip one or more days, in any biweekly combination, it is only necessary to depress the correct combination of tabs 21, since for each revolution of timer wheel 33, 14 day wheel 34 will rotate 1/14 of a revolution. This is accomplished by permanently extended tab 51 engaging one extended tooth 49, per revolution of wheel 33, and causing the 14 day wheel 34 to rotate 1/14 of a revolution. The 14 day timer wheel 34 is calibrated in 14 consecutive days, each associated with a given skip-a-day tab 21. The combination clock wheel/timerface 33 is calibrated in 24 hourly time intervals and rotates once every 24 hours. Clock wheel 33 is propelled by gear 27 extended through a hermetic sealed bushing in panel 63 and providing planetary drive for clock wheel 33. Propulsion is provided by electric motor 35. Also, shown in FIGS. 6 and 7, is the automatic-off-manual mode switch S98 which culd as well be of rotary type providing that a hermetic seal protects the interior of the switch and preserves casing interior integrity.

Figure 9:
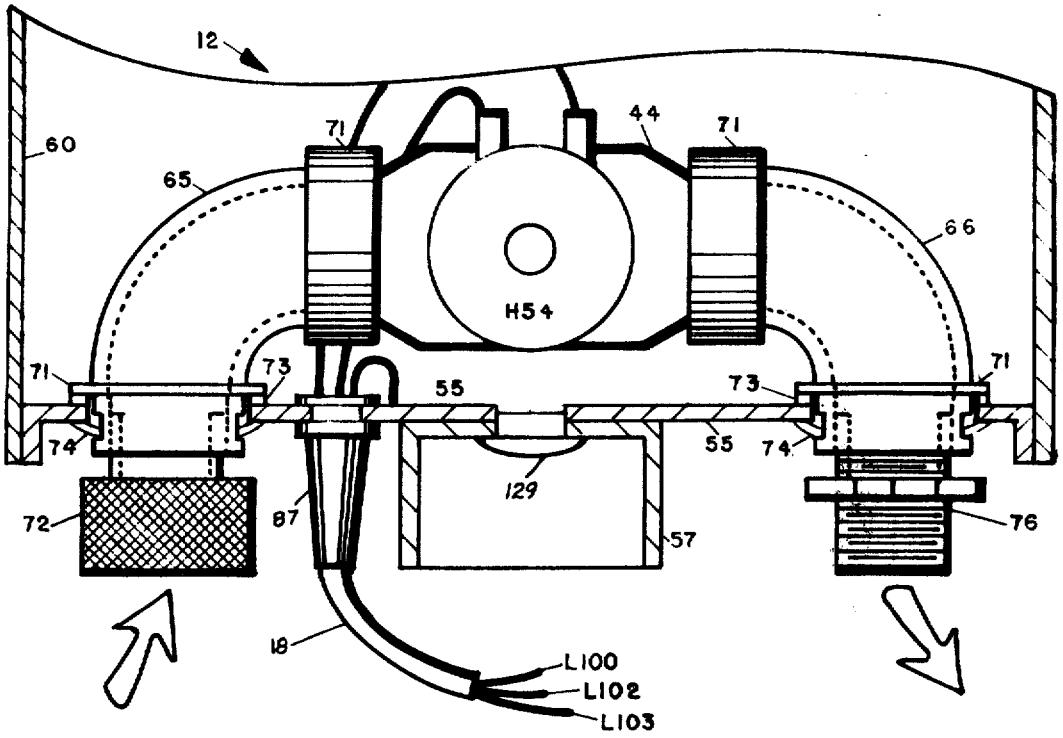
FIG. 9 is an elevation view of the bottom cover that shows the valve supported; therefrom, in accord with the principles of the present invention.

FIGS. 6 and FIG. 9 show the electromagnetically actuated solenoid H54, horizontally attached to fluid control valve 44. Attached to valve inlet and outlet are two 90° commercially available plumbing elbows 65 and 66 respectively. The arrangement, shown in FIG. 9, is unique in that it enables valve 44 to be self-supporting without special support fixtures or special inlet and outlet valve ports; thereby, providing a design that is economically feasible to manufacture. First, a low cost nylon casing type valve can be used. Secondly, the valve can be adapted to exterior connections 72 and 76 by means of conventional plumbing elbows 65 and 66; and thirdly, these plumbing elbows may be easily adapted to extend through the bottom plate 55 such that the connection of exterior flexible conduits 10 and 20 to fittings 76 and 72 respectively can not cause a water leak into the electrified interior of casing 60; thereby, causing an electrical shock hazzard. As shown, each 90 degree elbow has a conventional shoulder 71 at each end. One such shoulder 71 of each elbow is undercut providing a tube of lesser outer diameter than that of the shoulder. Valve 44 with elbows 65/66 attached is fitted with concentric seals 73, which are made of neoprene or other suitable material, and inserted through the two holes shown in the bottom cover. Gaskets 73 form a hermetic seal at each hole. Concentrically in the exterior surface of shoulders 71 are under cut slots into which are inserted beveled concentric snap rings 74. These rings bear against bottom cover 55; thereby, causing compression of seals 73 and a hermetic seal results. Further, the valve assembly comprising valve 44, actuator H54, and elbows 65/66 is entirely self supporting on bottom cover 55.

Referring to FIGS. 2 and 6, main casing 60 is fitted with a top cover 62 of frustoconical shape, that is hinged 45 at one diametric end and has a draw pull catch 42 at the other end thereof. Because of the unique gasket 61 design, upper cover 62 telescopes over control panel 63 flange and the top cover 62 seals peripherally against the upper outer annular surface of gasket 61.

Figure 10:
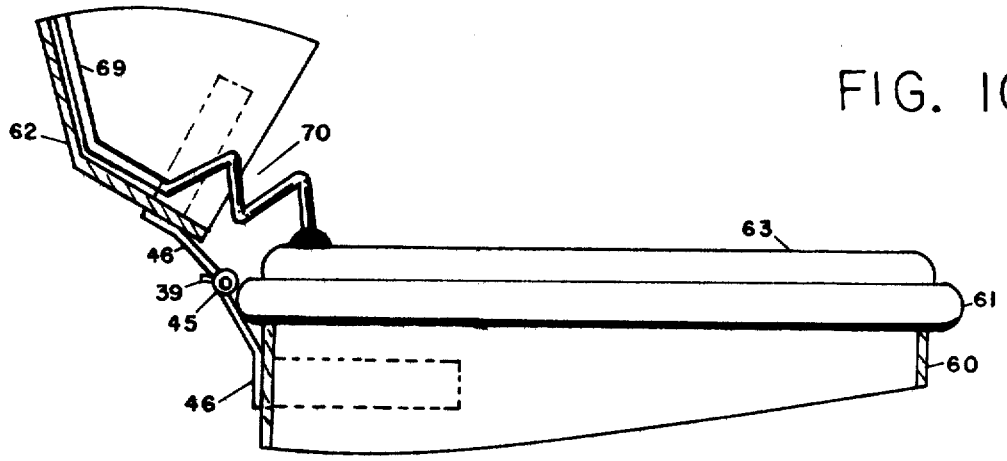
FIG. 10 is a partial cut-away elevation that shows the rain switch cable coil type hinge between lower main casing and top cover in accord with the principles of the present invention.

The hinge 45 is uniquely arranged to be fabricated from standard commercially available hinge stock. As shown in FIG. 10, the hinge leaves 46 are angled lengthwise to permit gasket 61 to be spanned. A portion of each leaf 46, a number of hinge links, and portion of pin 47 are removed from each end of the hinge. Finally, the four remaining extended leaf tabs 46 are arced to concentrically grasp the exterior surfaces of main casing 60 and top cover 62.

Perpendicularly inserted into one bottom leaf link of hinge 45 is a pin 39 which engages top leaf 46 and prevents its further rotation about pin 47. This limits rotation of top cover 62, with respect to main casing 60, to a given predetermined value that may be selected by judicious placement of pin 39 on hinge 45 link.

Diametrically opposite to hinge 45 on flow control casing is located a draw pull catch 42 which has a loop 41 that engages strike 43. Catch 42 is attached on exterior surface of main casing 60. Strike 43 is attached on exterior extremity of top cover 62. Loop 41 is attached to catch 42, spans gasket 61, and pulls strike 43. Catch 42 and lower hinge leaf 46 are positioned on main casing member 60; and, strike 43 and upper hinge leaf 46 are positioned on top 62, such that when catch 42 is closed a hermetic seal is formed between the peripheral extremity of top cover 62 and annular gasket 61.

Figure 14:
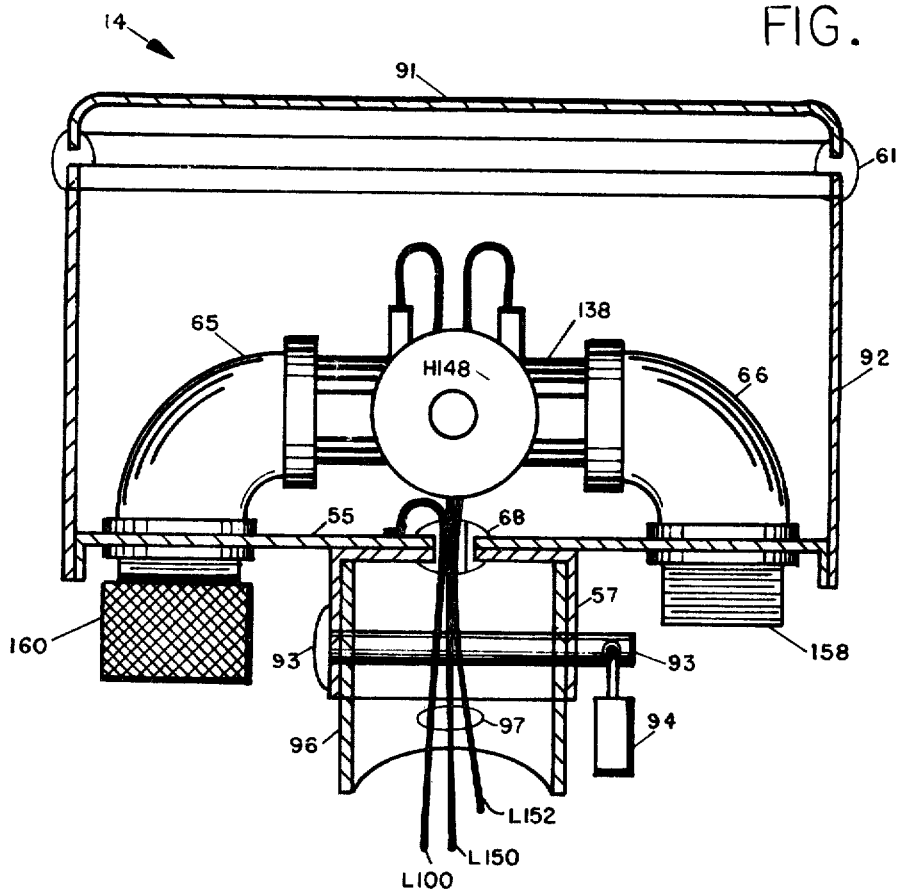
FIG. 14 is an elevation of an auxiliary outdoor valve showing the novel pin lock in accord with the principles of the present invention.

Referring to FIGS. 6, 9 and 14, control units 12 and 14 are supported by vertical stanchions 38 and 96 which are inserted into a cap 57 which is attached to bottom cover 55. Inserted perpendicularly through cap 57 and stanchion 96 extremities is a flange headed pin 93 with a hole at the opposite end; into which is inserted a padlock 94, as shown in FIG. 14. This prevents theft of control units 12 and 14.

As shown in FIG. 6, electric cable 18 may also be attached to unit 12 through a slotted hole in the upper end of stanchion 38. Cable 18 extends through hermetic grommet 68 in the center of bottom cover 55. If permanent installation of control unit 12 or 14 is desired, cable 18 may be deleted and hook-u0 wires 97 extended through grommet 68 (as shown in FIG. 14). Alternatively, cable 18 may be extended through bottom over 55 and attached thereto by means of a hermetic sealed strain relief 87, as shown in FIG. 9. In this arrangement, a hermetically sealed plug 129 is inserted in the center hole in the bottom cover 55. In this arrangement, if permanent wiring of unit 12 is desired, cable 18, as shown, is removed from its hole in bottom cover 55, and plug 129 is inserted therein. Hermetic grommet 68 and hook-up wires 97 are then inserted in the vacant center hole of bottom cover 55 (as shown in FIG. 14) This unique arrangement enables the same manufacturing production line to assemble units 12 and 14 that are adaptable to units intended either for portable or permanent installation. For example, electric cord 18 and power plug 80 are used in models intended for portable installation, while hook-up wires 97 are used in models intended for permanent installation.

Referring to FIG. 2, dead-front 3-wire grounded connector 82 is energized by a source of operating voltage of the order of 105–125 volts, 60 cps, AC. In power plug 80, of which connector 82 is a part, stepdown transformer T56 reduces the voltage to 24 volts 60 cps, AC or to other appropriate values such as for example, 12 volts, 60 cps, AC. This source of low operating voltage is available on conductors L102 and L104 in Cable 18. Valve 44 actuator H54 is energized from L104 via relay contact R50C1, clock switch contact S90, L106, mode switch S98, L103 and L102. Accordingly, when relay R50 is de-energized, contact R50C1 is closed. When clock 89 switch contact S90 is closed and mode switch S98 is in automatic position, valve actuator H54 will be energized and valve 44 will open. If mode switch S98 is placed in off position, valve actuator H54 lead L103 will be disconnected and valve 44 will remain closed independently of S90 and R50 contacts. If mode switch S98 is placed in manual position, valve actuator H54 will be energized by L104, L105, L103 and L102 independently of R50 and S90 contacts. Accordingly, in automatic mode switch position, valve 44 will open and close as clock timer 89 causes switch contact S90 to open and close, as long as relay R50 contact R50C1 is closed.

In like manner, as shown in FIGS. 2 and 14, outdoor control 14 auxiliary valve 138, if connected, will be opened and closed by means of low operating voltage applied to valve actuator H148 via conductors L150 and L152 in cable 154, connected to conductors L142 and L144 respectively in control unit 12.

Referring to FIGS. 2 and 6, attached to the exterior surface of control unit 12, top cover 62, is planimetric rain switch assembly 28 comprising spaced apart conductors 110 on rain switch S40 insulated base 164. Spaced apart conductors 110 are connected by terminals 166 and 168 to conductors L118/L122 and L120/L126 respectively, that are contained in hermetically sealed cable 69. A detailed description of the planimetric rain switch is given in U.S. Pat. No. 3,809,116 FIGS. 3, 4, 5, 6 and beginning with line 62 of column 10.

Referring to FIGS. 2 and 6, rain switch assembly 28 comprises planimetric rain switch S40 mounted at an angle within stack 170. Attached to the inside of the upper flange of stack 170, in the example shown, is a hemispherically shaped wire screen with a peripheral flange. Planimetric switch S40 is circular in perimetric shape and is disposed in stack 170. The edge of switch S40 may be removed to enable rain water, entering through screen 171, to run off switch base 164 and exit from stack 170 by flowing between top cover 62 exterior surface and stack 170 lower flange. Hermetically sealed cable 69 enters top cover 62 through hermetic seal 101 and is radially attached to the interior surface of top cover 62 and extends via continuous loop coil 70, through hermetic seal 99, located in surface of control panel 63, into main casing 60. The purpose of loop coil 70 is to provide an effective flexible joint or hinge for cable 69 to prevent conductors L100, L122, and L126 from breaking, as top cover 62 is opened and closed with respect to main casing 12, by means of hinge 45. FIG. 10 shows how this is accomplished. When top cover 62 is closed, as shown in FIG. 6 coil 70 compresses into several contiguous loops. This is the normal state of the cable and it is achieved by molding cable 69 to include loop configuration 70. When top cover 62 is opened, by means of hinge 45, as shown in FIG. 10, individual cable loops in coil 70 are expanded. When top cover 62 is closed loop coil 70 returns to its initial configuration as shown in FIG. 6. In this manner cable conductors span hinge 45, and as hinge 45 is manipulated, cable 69 contained conductors L100, L122, and L126 are not broken.

As shown in FIG. 2, low operating voltage is applied to relay actuator R50, when rain switch S40 is conductive, via L102, L126, L120, 168, 110, 166, L118, L122 to R50, and thereto, from L104 via L124. During rainfall, S40 is conductive due to the presence of conductive, moisture on spaced apart electrodes 110. This causes the electromagnetic actuator coil of R50 to be energized; thereby, causing contact R50C1 to open and R50C2 to close.

When contact R50C1 opens, if mode switch S98 is in automatic position and clock timer switch contact S90 are closed, valve actuator H54 will be de-energized and valve 44 will close thereby terminating sprinkling. When R50C1 opens contact R50C2 closes and connects source of low operating voltage, present on conductor L102, to remote rain alarm 16, via conductor L108 in cable 165; and, connects conductor L104 via relay contact R50C2 to conductor L107.

Thus, when timer 89 switch contact S90 closes and mode switch S98 is in "automatic" position, valve 44 will open and close as clock timer switch contact S90 opens and closes if contact R50C1 is closed. If clock timer switch contact S90 is closed, valve 44 will open and sprinkling will occur unless rainfall occurs when relay R50 will be energized; thereby, opening contact R50C1 and causing sprinkling to terminate.

It is clear that valve 44 will remain closed until rain switch S40 and/or timer switch contact S90 are opened. Should rainfall cease before the preselected timer 89 cycle expires, relay R50 will be de-energized, contact R50C1 will close, valve actuator H54 will be energizer, valve 44 will open, and lawn sprinkling will again occur. At the end of preset timer 89 cycle, switch contact S90 opens, valve actuator H54 is de-energized, valve 44 closes, and lawn sprinkling is terminated.

During light rainfall or during the initial and/or terminal periods of rainfall, the operation of rain switch contact S40 may be somewhat erratic, due to a state of intermittent conductivity between spaced apart electrodes 110. This may cause relay R50 to be energized in a somewhat erratic manner; thereby, causing contacts R50C1 and R50C2 to be somewhat erratic. In like manner the operation of valve 44 and rain alarm 16 may also be somewhat erratic. Finally, lawn sprinklers 11 may be somewhat intermittently operative as a result. To prevent this difficulty relay R50 is selected to be a conventional time delay type.

Electronic, thermal, and solid state comprise the many different types of time delay relays that are commercially available with time relays ranging from a few tenths of a second to several minutes. In addition, these delay relays can provide both delay-on-operate and/or delay-on-release operation. Finally, such relays may have a fixer delay or be adapted for manually adjustable delay. The sprinkler controls described herein may be adapted to any of the desired time delay relays. A few seconds delay is provided in the relay R50 between the energization of R50 and the opening of contact R50C1. In this manner, at the first impact of moisture on rain switch S40 a delay period begins and, at the end thereof, relay contact R50C1 opens and R50C2 closes. This results in relay R50 operations that are decisive in nature. It follows that sprinkler 11 and rain alarm 16 operations are equally pronounced. As a result valve, rain alarm and sprinkler "flutter" are avoided.

Figure 12:
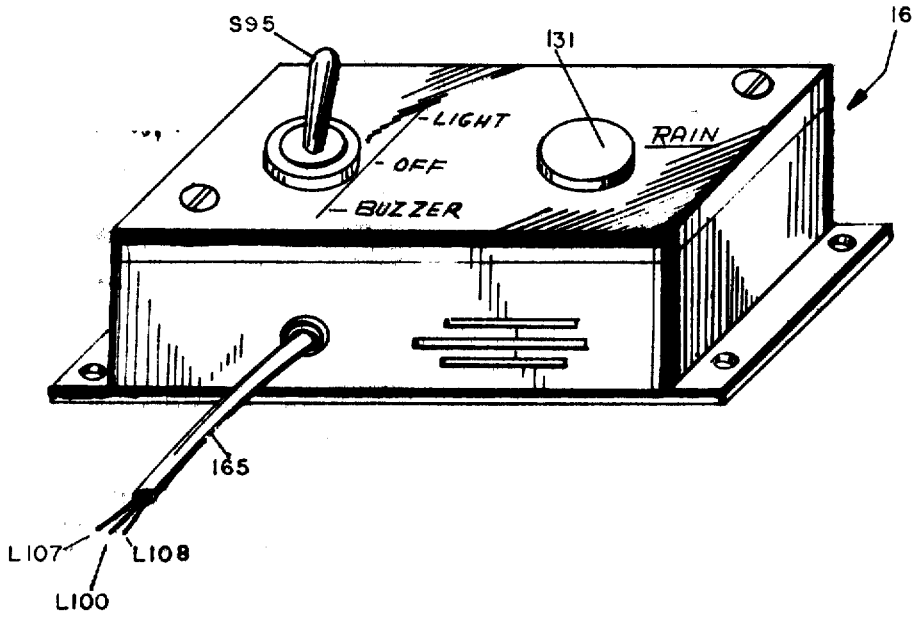
FIG. 12 is a pictorial view of the remote rain alarm unit in accord with the principles of the present invention.
Figure 13:
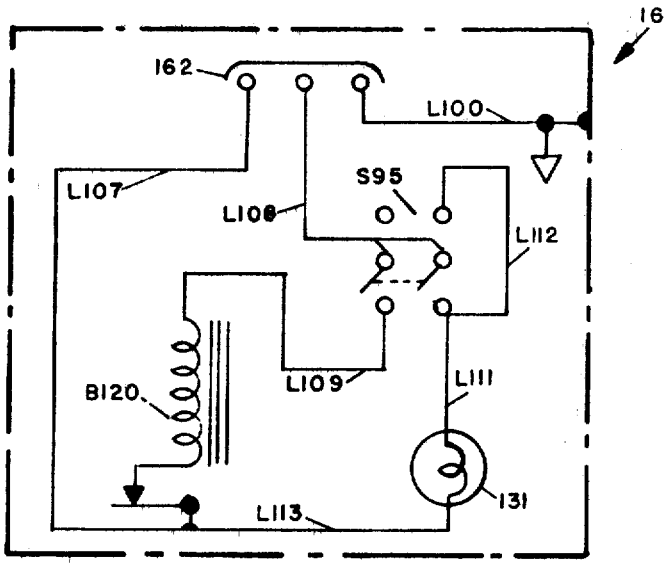
FIG. 13 is a schematic diagram of the remote rain alarm unit of FIG. 12.

In remote rain alarm 16, shown in FIGS. 2, 12 and 13, L107 is connected to audible buzzer B120 and to indicator light 131 via conductor L113. Conductor L108 is connected to both poles of three contact, double pole, switch S95. Buzzer B120 and indicator light 131, opposite terminals, are connected to one pair of switch contacts, by conductors L109 and L111 respectively, and conductor L112 connects one contact of a third pair of switch contacts to indicator light opposite terminal. S95 second position switch contacts (not shown) are not connected. Thus, when switch S95 is in first or "buzzer" position, a source of low operating voltage is connected to buzzer B120 by relay contact R50C2 and conductors L104, L107; and, via L109, S95, L108 and L102. Indicator light 131 is also connected in parallel with B120 by conductors L113, L111, switch S95 and L109. In this position, both buzzer B120 and light 131 will signal an alarm during rain fall. If S95 is in third or "light" position, buzzer B120 is disconnected from conductor L108 by switch S95; but, light 131 remains connected to L108 by conductor L112 and S95. Accordingly, in "light" position S95 provides a visual indication, but no audible alarm, that rain is falling. In a second or "off" position, S95 poles are disconnected and in that position both buzzer B120 and indicator light 131 are inoperative.

Figure 15:
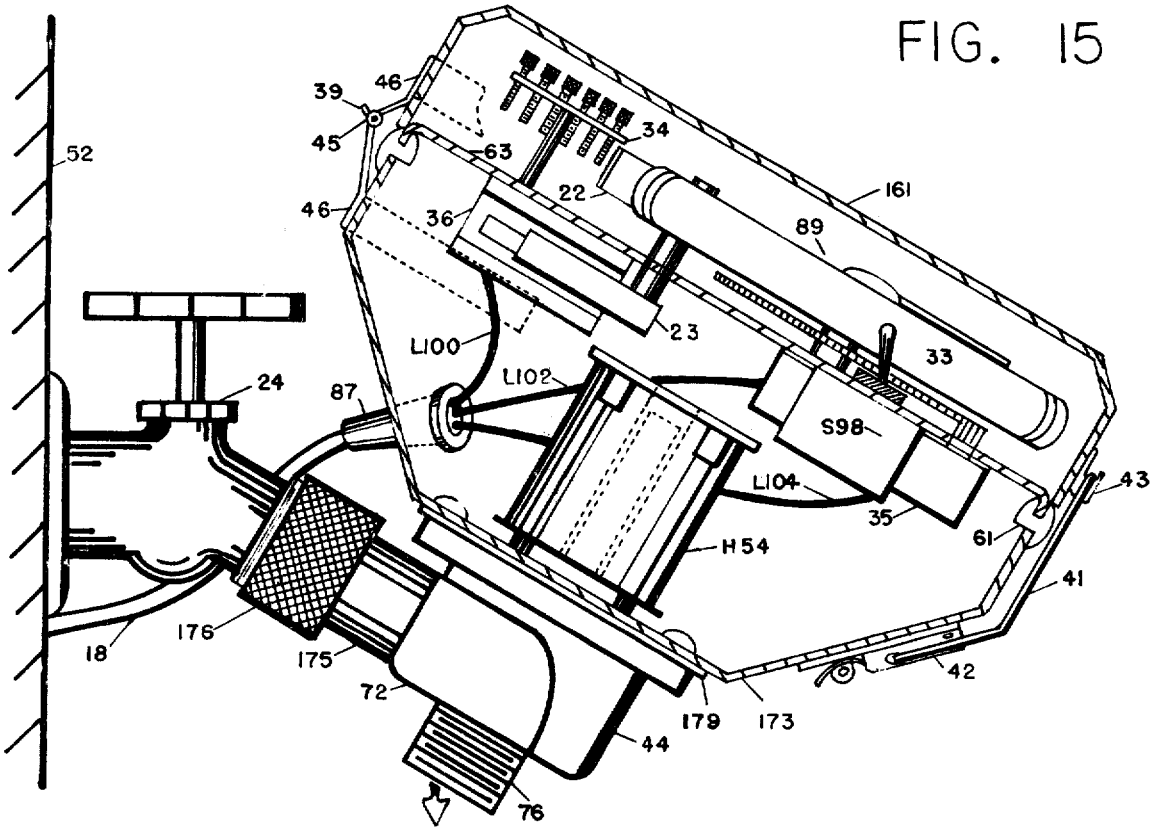
FIG. 15 is an elevation of a faucet supported sprinkler control in accord with the principles of the present invention, the casing of the unit being broken away to show its internal components.
Figure 16:
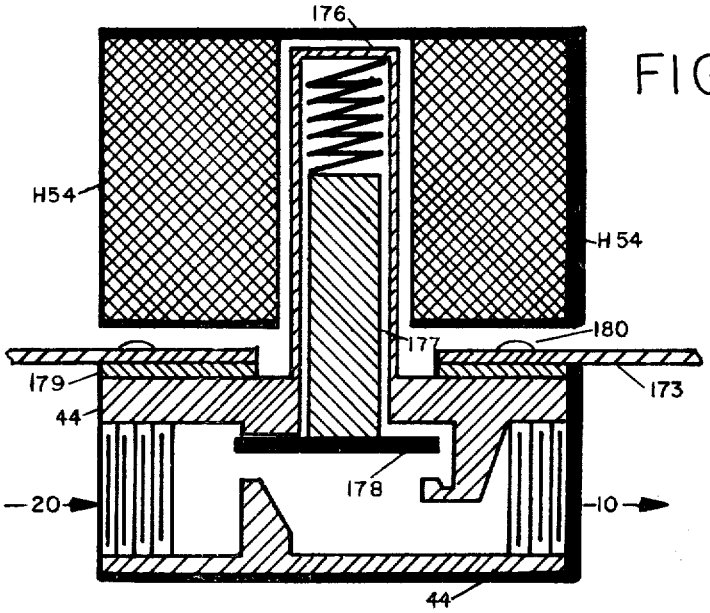
FIG. 16 is an elevation of the valve mounted to a heremetic sealed casing exterior with the valve actuator enclosed inside of the casing in accord with the principles of the present invention; and, FIG. 17 is a side elevation of the sprinkler control enclosed in a rectangular casing adapted for indoor installation in accord with the principles of the present invention.
Figure 17:
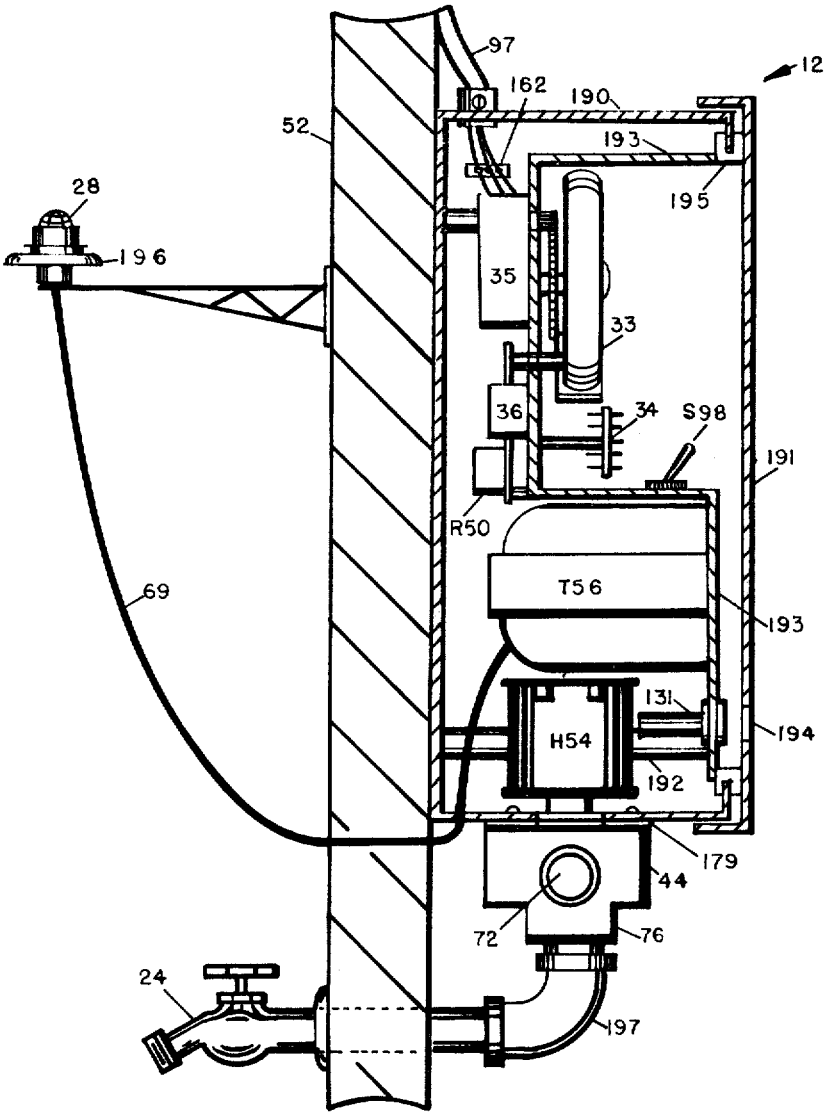

FIG. 5 shows a schematic diagram, previously described, of a faucet mounted and supported flow control. An elevation of this sprinkler control is shown in FIG. 15, where valve 44 housing is disposed exteriorly of main casing member 173 and valve actuator H54 is disposed inside of casing 173. This is accomplished by a novel valve design in conjunction with a unique arrangement of hermetic seals. FIG. 16 shows an elevation of this arrangement which is exemplified by its simplicity. Valve housing 44 is an enclosed unit attached and sealed to actuator tube 176 that is inserted into concentric electromagnetic valve actuator solenoid H54. A magnetic plunger 177 is connected to valve seal 178 such that when solenoid H54 is energized, core 177 is drawn up into tube 176, thereby, opening the valve and allowing fluid to flow therethrough from inlet conduit 20 to outlet conduit 10. Main valve housing 44 is attached to main casing 173 exterior with fasteners 180 and a hermetic seal is achieved by gasket 179. This unique arrangement permits the valve to be mounted as shown in the faucet mounted sprinkler control shown in FIG. 15 and, additionally, on the indoor mounted control which is shown in FIG. 17.

In FIG. 15, the main casing member 173 is of frustoconical design to provide access directly to valve inlet 72 and outlet 76 ports for attachment of conduit extension 175 to faucet outlet 24. Flexible conduit 10 and sprinkler 11 are attached directly to valve port 76. As shown, valve actuator H54 is located in the hermetically sealed interior of main casing 173. A control panel 63, with disposed thereon timer 89 and mode switch S98, all previously described, is attached to main casing 173, by, also previously described, gasket 61. A slightly modified cover lid 161 is hermetically sealed to annular gasket 61 by hinge 45 and draw pull catch 42 in the same manner herein already described. The faucet supported sprinkler control is energized with electric cable 18 and power plug 80 in the same manner as previously described.

Figure 11:
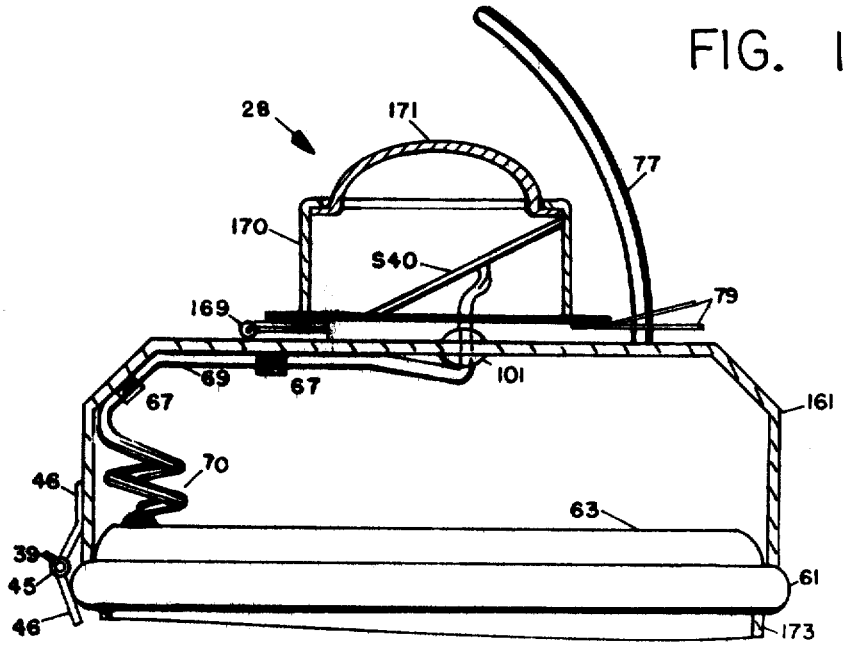
FIG. 11 is a partial cut-away elevation in accord with the principles of the present invention showing the rain switch mounted on the top cover with means for adjusting its elevation angle.

Additionally, as shown in FIG. 2, the faucet supported sprinkler control may be adapted to be inoperative during rainfall by addition of rain switch S40, cable 69, conductors L122 and L126 and relay R50 with contact R50C1. In this arrangement, rain switch assembly 28 is mounted, as shown in FIG. 11. Stack 170, containing rain switch S40 and wire screen 171, is attached to the top cover 161 by hinge 169 and is rotatable therefrom. Attached to stack 170 lower flange are a pair of spring tabs 79 with holes, through which is inserted guide 77. When the tabs are pressed together rain switch assembly 28 is released from guide 77 and may be rotated about hinge 169, being diametrically guided by guide 77 in conjunction with tabs 79. When the correct angle of rain housing 28 is achieved, with respect to cover 161 top, spring tabs 79 are released; thereby, binding on guide 77 and causing rain switch assembly 28 to be held at that angular position. It is obvious that other means may be used to hold rain switch 28 at the desired angle. For example, guide 77 could be notched and a screw type or other clasp means could replace tabs 79. This arrangement enables rain switch S40 to be set at a correct angle for precipitation drainage for all possible faucet 24 angles.

Referring to FIGS. 2 and 3, the sprinkler control is arranged to provide safety from electrical shock hazzard. This has been achieved in a manner that it not only practical but economically feasible to manufacture. Beginning with ground pin 83 on dead-front connector 82, a ground conductor L100 is connected between the residential service inlet ground and power plug 80 causing, then through extension cable 18 to spinkler control 12 casing; from which L100 ground wire is extended through cable 69 to rain switch housing 28, and through cable 165 to rain alarm 16 casing. In control unit 12, ground conductor L100 is also connected to control panel 63 and in cable 69, ground conductor L100 is connected to top cover 62 to insure a safety ground, in addition to, electrical conduction resulting via hinge 45. Finally, auxiliary control units such as outdoor valve 14 of FIGS. 1 and 14 are connected to grounded conductor L100 via cable 154. In this manner, it is virtually impossible for the consumer user to suffer electrical shock during operation of these sprinkler control units. Finally, as shown in FIG. 3, a thin disc of soft neoprene material 75 is attached to the face of power plug dead-front connector, with pins 81 and 83 extended therethrough, thereby, causing a hermetic seal between power plug dead-front electrified pins 81 and group pin 83, and the electrified conventional receptacle outlet.

It is obvious to those skilled in such related art that the sprinkler flow controls described heretobefore are unique in that the various different models, such as shown in FIG. 1, may be arranged into a novel do-it-yourself "family", whereby the average home owner may install a complete semi-portable aboveground sprinkler system. For example, FIG. 1 shows a sprinkler control 12 and an additional outdoor valve 14, in one such system; and, additionally, sprinkler control 12 can be mechanized without rain switch 28, as already described. Also, outdoor valve 14 can be adapted with a rain switch assembly 28.

FIG. 17 is an elevation that shows the sprinkler control of FIG. 2 housed in a rectangular casing for indoor installation. In this arrangement, the unit may be permanently installed, or a power plug 80 and extension cable 18 may be used for simple "plug-in" operation. Also, valve 44 is mounted to the exterior of casing 190 in the same manner, as shown in FIG. 16. If permanent wiring is utilized, transformer T56 is included in the unit and disposed on panel 193 as shown. While the control may be arranged without rain override means, the inclusion thereof may be provided by means of rain switch assembly 28 disposed on platform 196. This assembly may be exteriorly mounted on a vertical stanchion or may be mounted on a horizontal hanger extended from the exterior surface of a building.

The indoor model, shown in FIG. 17, comprises a rectangular box 190, a control panel 193, a cover 191, a gasket 195, a valve 44 and plumbing means 197 to extend valve outlet port 76 to outdoor accessible valve 24; to which, is attached sprinkler 11. This apparatus may be mounted on an indoor wall 52. The indoor models utilize terminal connectors 162 such as are shown in FIG. 2, to connect thereto, auxiliary valve control 14 cable 154, rain alarm 16 cable 165, and operating line voltage cable 97. Additionally, rain alarm circuit 16 may as well be included and visual indicator 131 may be disposed behind hinged cover 191 hole 194 such that visual indication is displayed when cover door 191 is closed on main housing 190.

Additional indoor valves 138 may be remotely located in the same building and plumbed to additional outdoor faucets 13. As for example, the sprinkler control of FIG. 17 may be installed on a basement wall to provide water (valve 24) for front lawn sprinkling while an auxiliary indoor valve (indoor version of control 14) may be mounted on an opposite basement wall to provide water (valve 13) for the rear lawn sprinkling. In this example, the indoor version of auxiliary valve is 14 connected to the sprinkler control of FIG. 17 by permanently installed wiring utilizing terminal strips 162 for effecting wiring connections. Also, it is obvious that the indoor valve 14 of FIGS. 1 and 14 may as well be connected to the indoor sprinkler control of FIG. 17. In this manner, it is possible to provide a completely flexible system of outdoor, indoor, or combination indoor-outdoor sprinkler controls for aboveground lawn sprinkler systems. It is equally obvious that such a system of controls could as well be utilized with an underground installed lawn sprinkling system.

It will be apparent to those skilled in the art to which it pertains that the invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalents of the claims are therefore intended to be embraced therein.

What is claimed and desired to be secured by letters Patent is:

[1. A flow control for a fluid flow system having a fluid conduit with an electrically actuated flow control valve therein, comprising: a step-down transformer providing means for reducing a source of operating voltage to a source of low operating voltage; a first circuit means for connecting the said source of low operating voltage to the valve actuator; a first switching means comprising timing means for automatically completing said first circuit means to energize the said valve actuator and thereby open the said valve and allow a flow of fluid through said conduit for a predetermined period of time, and upon completion of the said time period, said first switching means interrupts said first circuit means continuity causing said valve actuator to be de-energized, said valve to close, and terminate said fluid flow through said conduit; a second switching means comprising an electrically actuated, single pole, double contact, switch with a switch actuator, which when energized, causes a first contact to open and a second contact is closed, and when said switch actuator is de-energized, said first contact is closed and said second contact is opened; said first contact connected in series with said source of low operating voltage, said first switching means, and said valve actuator all in said first circuit means, and, upon energization of said switch actuator, causes said first contact to open, continuity of said first circuit means is interrupted, thereby, overriding said first switching means, de-energizing said valve actuator, causing said valve to open, and terminating said fluid flow therethrough; said series connected circuit which, upon de-energization of said swich actuator, causes said first contact to close, restoring control of said first switching means, completing continuity of said first circuit means, energizing said valve actuator, causing said valve to open, and said fluid to flow therethrough; said second contact of said second switching means connected in series with a second circuit means and said source of low operating voltage, such that when said switch actuator is energized, the said second contact closes energizing the said second circuit means with the said source of low operating voltage, and when the said switch actuator is de-energized, said second contact opens removing the said source of low operating voltage from the said second circuit means; a third circuit means comprising said switch actuator, third circuit conductor means, and said source of low operating voltage all in series with a planimetric rain switch which, when closed, completes the continuity of said third circuit means, and when said rain switch is open, continuity of said third circuit means is interrupted; said planimetric rain switch comprising an insulated member having a surface which is adapted to be oriented to receive rain thereon, with first and second spaced apart conductor means disposed on said surface and connected to said third circuit conductor means which are adapted to be electrically connected by rain on said insulating surface, completing the continuity in said third circuit means, energizing said switch actuator, causing said first contact to open, overriding said first switching means, interrupting said first circuit means, de-energizing said valve actuator, closing said valve, terminating said fluid flow therethrough; and, upon cessation of said rain on said insulating surface, interrupting said third circuit means, de-energizing said switch actuator, causing said first contact to close, and restoring control of said valve actuator to said first switching means substantially conterminously with said rain cessation.]

[2. The flow control of claim 1 wherein the said second switching means comprises: time delay means causing said first contact to open and said second contact to close at the end of a first given predetermined time interval after the said relay actuator is energized; and said time delay means causing said first contact to close and said second contact to open immediately upon de-energization of said relay actuator.]

[3. The flow control of claim 2 wherein the said predetermined time interval is adjustable.]

[4. The flow control of claim 3 wherein said timer means comprises a timer providing multiple, contiguous, predeterminable, selectable, time control intervals within any given hourly time period, and wherein, any number of said selectable time control intervals may be selected in any given 24 hour time period, comprising: means for selecting said selectable time control intervals by means of moveable mechanical tabs disposed radially and perpendicular to the peripheral extremity of a time wheel; timer operating means for causing said time wheel to repetitively complete one revolution in each said 24 hour time period; said tabs, and timer switch operating means, causing an electrical timer switch contact to be actuated during the said predetermined, selectable, time control intervals; and said timer switch electrical contact is connected in series with said first circuit means.]

[5. The flow control of claim 4 wherein the said selectable time control intervals, occuring during any combination of said 24 hour time periods, within a given continuous time period comprising 14 consecutive said 24 hour time periods, may be overriden by means, comprising: a 14 day time wheel driven by the said 24 hour time wheel such that said 14 day time wheel completes 1/14 of a revolution for each revolution completed by the said 24 hour time wheel; said 14 day time wheel comprising 14 mechanically positionable tabs equally spaced circumferentially along the peripheral extremity of the said 14 day time wheel; and said 14 day time wheel tabs selectively positionable to override the said timer switch operating means and said electrical timer switch contact and thereby prevent the actuation of said switch contact during any combination of said 24 hour time periods within the said given continuous time period.]

[6. The flow control of claim 5 in combination with a third switching means incorporated in the said first circuit means providing an "automatic" mode of operation wherein said valve actuator is energized by said first and said second switching means in said first circuit means, an "inoperative" mode of operation wherein said valve actuator is disconnected from said first circuit means, and a "manual" mode of operation wherein said valve actuator is electrically connected directly to the said source of low operating voltage, comprising: a single pole, three contact mode switch providing, in conjunction with said switch pole, a first, second and third switch contact position; said "automatic" mode of operation in which, said mode switch first contact is closed, and said valve actuator is connected in series with said first switching means, said second switching means first contact, and said source of low operating voltage, causing said valve actuator to be actuated when said first switching means and said second switching means first contact are closed; said "inoperative" mode of operation in which said mode switch second contact is closed, and said valve actuator is disconnected from said first circuit means, causing said valve actuator to remain de-energized independently of said first switching means and said second switching means; and said "manual" mode of operation in which, said mode switch third contact is closed, said valve actuator is electrically connected directly to the said source of low operating voltage, and said mode switch third contact is connected to the said single pole of the said second switching means, thereby, energizing the said valve actuator independently of said first and second switching means.]

[7. The flow control of claim 6 in combination with said second circuit means comprising: a rain alarm means which signals during rainfall duration; and said rain alarm that is operative during said rainfall duration independently of said first switching means thereby indicating the presence and absence of said rainfall independently of the operational status of the said first switching means.]

[8. The flow control of claim 7 in combination with a three position fourth switching means, comprising: a simultaneous audible and visual alarm signal during rainfall when said fourth switching means are in a first position; no alarm signal during rainfall when said fourth switching means are in a second position; and a visual alarm signal during rainfall when said fourth switching means are in a third position.]

[9. The flow control of claim 8 in combination with means for controlling an additional fluid controlling or effecting device, comprising: a fourth circuit means comprising fourth circuit conductor means, remote valve actuator, remote valve and remote conduit coupled to said valve; said fourth circuit conductor means connected in parallel with said valve actuator; said remote valve actuator connected in parallel with said fourth conductor means causing said remote valve actuator to be energized and de-energized substantially conterminously with the energization and de-energization of said valve actuator; and said remote valve controlling flow of said additional fluid in said additional conduit substantially conterminously with flow of said fluid in said conduit.]

[10. The flow control of claim 9 wherein said first circuit means is reduced to a fifth circuit means by removing said step-down transformer from said first circuit means and remotely disposing said transformer into a sixth circuit means that reduces the said source of operating voltage to the said source of low operating voltage, said sixth circuit means, comprising: a hermetically sealed plug casing in the interior cavity of which, is disposed the said step-down transformer and attached to, and protruding from, the exterior surface of said plug casing is a conventional hermetically sealed 3-pin grounded plug that plugs into a conventional grounded electrical service outlet receptacle; said plug casing is self-supporting when attached to said electrical service outlet receptacle by means of said 3-pin grounded plug; two line pins of said 3-pin grounded plug connected to said step-down transformer primary coil in said sixth circuit means; ground pin of said 3-pin grounded plug connected to said plug casing; said step-down transformer secondary coil connected to a multiple-conductor extension cable thereby connecting the said source of low operating voltage in said sixth circuit means to the said fifth circuit means; and one ground conductor, of said multiple-conductor extension cable, connected to said plug casing and providing grounding circuit continuity for said second, said third, said fourth, and said fifth circuit means.]

[11. The combination of claim 10 wherein the said primary coil and the said secondary coil, of the said step-down transfer, are wound and supported on a coil core frame that is an integral continuation of the said plug casing cavity wall interior surface; exterior surface of said plug casing is constructed of electrically insulated material; said coil core frame is constructed of thermally conductive material which protrudes through said plug casing causing heat, generated by said step-down transformer, to be radiated away from said plug casing; and said plug casing mechanically and thermally connected to said ground pin of said 3-pin grounded plug providing a thermal conduit for heat, generated in said step-down transformer coil core frame, to flow into said conventional electrical service grounded outlet receptacle.]

[12. The combination of claim 11 wherein the said step-down transformer is of energy limiting, grounded-barrier, type and said grounded-barrier is electrically connected to said coil core frame, to said plug casing, to said ground pin of said 3-pin grounded plug, and to said ground conductor of said multiple-conductor extension cable.]

[13. The flow control of claim 12 wherein the said second switching means comprises: time delay means causing said first contact to open and said second contact to close at the end of the said first given predetermined time interval after the said switch actuator is energized; and said time delay means causing said first contact to close and said second contact to open at the end of a second given predetermined time interval after the said switch actuator is de-energized.]

[14. The flow control of claim 13 wherein the length of the said first given predetermined time interval and the length of the said second given predetermined time interval are adjustable.]

[15. A flow control for a flow control system comprising: a casing having a main casing member that is of right circular cylindrical configuration, a bottom cover fitted into and fixed to said main casing member at one end thereof, a panel affixed to and closing said casing member at the opposite end thereof, said bottom cover having a flat portion spanning said main casing member with a flange around the periphery of said bottom cover flat portion abutting the interior of said main casing member, and said panel having a flat portion spanning said main casing member with a flange around the periphery of said panel flat portion, peripheral extremity of said panel flange in contiguous circumferential abuttment with the peripheral extremity of said main casing member; inserted contiguously between the said panel flange peripheral extremity and the said main casing member peripheral extremity a continuous annular gasket, the said panel flange peripheral extremity is sandwiched circumferentially into the upper annular face of the said gasket, and the opposite annular face of the said gasket is telescoped over the said main casing member peripheral extremity thereby providing a heremetic seal between the exterior surface of said panel and the interior surface of the said main casing member; a top cover comprising a frustoconical portion and a cylindrical portion the peripheral extremity of which is telescoped over the exterior surface of the said panel peripheral flange and abutts circumferentially the said upper annular face of the said annular gasket thereby providing a hermetical seal between the exterior surface of the said top cover and the exterior surface of the said panel; a fluid flow valve with an electrically operated actuator housed in said casing, said actuator being operable on voltage available at an electrical power source located externally of said casing; valve operating means in said casing for energizing and de-energizing the valve actuator to open and close the valve thereby control the flow of fluid therethrough said valve operating means comprising a timer having a switch and switch operating means for opening and closing said switch in an automatic repetative cycle; a single electrical conductor means extending from the interior to the exterior of said casing for connecting said valve operating means to said external electrical power source conductors in said casing connecting said valve actuator to said conductor means in series with said switch and for connecting said conductor means to said switch operating means; manually manipulatable connection means disposed on the exterior side of said casing to which fluid supply and delivery means can be coupled; and means providing fluid communication from said connection means through said casing means to the inlet and outlet of said fluid flow valve.]

[16. The flow control unit of claim 15 in combination with a hinge connecting the said top cover to the said main casing member wherein: leaves of said hinge span the said annular gasket and the longitudinal pivot axis of the said hinge is located with respect to the said top cover and the said annular gasket to minimize the distance between peripheral extremity of said top cover and said upper annular face of said gasket when the said top cover is rotated to its maximum open position; means for attaching said hinge to cylindrical surface of said main casing member and to cylindrical surface of said top cover wherein said hinge leaves are longitudinally arced while said hinge axis is longitudinally straight and parallel to axis of said hinge leaves; means to limit angular movement of said hinged top cover with respect to said main casing to a predetermined maximum limit by disposition of a mechanical limit on one leaf of said hinge, the extent of the angular rotation of the juxtapositional said hinge leaf being determined by the said mechanical limit.]

[17. The combination of claim 16 wherein the said hinge is spring loaded causing the said top cover peripheral extremity to abutt the said upper annular face of the said annular gasket providing a hermetic seal between the said exterior surface of the said top cover and the exterior surface of the said panel.]

[18. The combination of claim 17 wherein a draw pull catch is disposed on the exterior surface of the said main casing at a point that is diametrically opposite the said hinge; a strike is disposed on the exterior surface of the said top cover; the loop of the said draw pull catch spans the said annular gasket and engages the said strike; causes the said top cover to hermetically seal to the said upper plane of the said annular gasket when said draw pull catch is actuated; and means wherein said draw pull catch may be locked in a closed or in an open position.]

[19. The flow control of claim 18 wherein the said timer is disposed upon, and supported by, the said panel; said timer means and said timer switch operating means disposed on the exterior surface of said panel being non-electrical; said timer means, said time switch, and said timer operating means disposed on the interior surface of said panel, being electrical; said timer operating means, disposed on the interior surface of said panel motivating the said timer disposed on the exterior surface of said panel, by means of a single rotating drive shaft that protrudes through a hermetically sealed bushing extending from said panel interior surface to said panel exterior surface; and said timer switch operating means disposed on said panel exterior surface actuating said timer switch operating means and said timer switch, disposed on said panel interior surface, by means of an angularly oscillating drive shaft means protruding through a hermetically sealed bushing extending from said panel interior surface to said panel exterior surface.]

[20. The flow control of claim 19 in combination with a three position mode control switch disposed on the said panel; in one position said mode control switch connects said valve actuator to said valve operating means causing the opening and closing of said valve to be controlled by said timer; in a second position said mode control switch disconnects said valve actuator from said valve operating means thereby making said valve actuator inoperative; in a third position said mode control switch overrides said valve operating means and connects said valve actuator directly to said single electrical conductor means, extending said external electrical power to said casing interior, thereby actuating said valve actuator; and said mode control switch is disposed on said panel interior surface and is actuated by mechanical control means protruding through a hermetically sealed bushing extending from said panel interior surface to said panel exterior surface.]

[21. The flow control of claim 20 wherein said valve is disposed on said bottom cover interior surface with said fluid communication means connecting said valve inlet and said valve outlet to said connection fluid supply and delivery means, said fluid communication means comprising: an inlet pipe fitting between said connection supply means and said valve inlet, and an outlet pipe fitting between said valve outlet and said connection delivery means; said inlet pipe fitting and said outlet pipe fitting of conventional plumbing type with an annular shoulder flange at both inlet port and outlet port of each said fitting; said outlet port, of said inlet fitting, attached to said valve inlet, and said inlet port of said inlet fitting attached to, and protruding through, said bottom cover; said inlet port of said outlet fitting attached to said valve outlet, and said outlet port, of said outlet fitting, attached to, and protruding through, said bottom cover; said inlet port shoulder flange of said inlet fitting, and said outlet port shoulder flange of said outlet fitting, partially removed by undercutting to provide for each said flange a cylindrical tube of reduced outside diameter with one extremity of each cylindrical tube concentrically orthogonal to and abutting remaining portion of each said shoulder flange; an annular hermetic seal placed concentrically over each said cylindrical tube, of said reduced outside diameter, and abutting circumferentially the annular face of the said remaining portion of the said shoulder flange on the said inlet port of said inlet fitting and on said outlet port of said outlet fitting; said flow valve, said inlet fitting, said outlet fitting and said annular hermetic seals assembled on said bottom cover interior surface, each said cylindrical tube extending through a circular hole in said bottom cover, thereby, sandwiching said annular gasket between said annular faces of said remaining shoulder flanges and the said bottom cover; each said cylindrical tube having an annular slot undercut on the outside surface of said tube adjacent to the said bottom cover exterior surface; a spring tensioner, beveled, annular snap ring inserted into each said undercut slot and circumferentially gripping each said cylindrical tube; each said beveled snap ring exerting force against said bottom cover exterior surface, thereby, compressing each said annular seal between each said undercut shoulder flange and said bottom cover interior surface, causing a hermetic seal between said bottom cover exterior surface and said bottom cover interior surface; and causing said valve and said fluid communication means to be self supporting on said bottom cover.]

[22. The flow control of claim 21 wherein said single electrical conductor means, comprise: a hermetically sealed multiple-conductor cable extending remotely from said casing to said external electrical power source; one extremity of said cable having a grounded conductor connected to said casing, additional conductors connected to said valve operating means in said casing interior, and the opposite extremity of said cable connected to said electrical power source by means of a hermetically sealed electrical plug casing; said plug casing provided with a conventional hermetically sealed 3-pin grounded plug that plugs into a conventional grounded electrical service outlet receptable, thereby, connecting said valve operating means to said external electrical power source; a step-down transformer mounted in the interior of said plug casing, primary leads of said transformer connected to line pins of said 3-pin grounded plug, and secondary leads of said transformer connected to conductors in said multiple-conductor cable thereby providing a source of low operating voltage to said valve operating means; ground pin of said 3-pin grounded plug connected to said plug casing and to conductor in said multiple-conductor cable; said step-down transformer coil core frame extended through and protruding from said plug casing exterior surface and, thereon, attached to cooling fins which radiate heat generated by said transformer; one extremity of said multiple-conductor plug extension cable terminated in said casing, and opposite extremity thereof, terminated in said plug casing by means of moulded strain relief terminations which provide a hermetic seal between exterior surface of said multiple-conductor cable and interiors of both the said casing and the said plug casing; and a thin disc of low durometer hermetic sealing material spanning exterior surface face of said 3-pin grounded plug, said three pins extending therethrough, providing a hermetic seal between exterior surface of said plug casing and interior of said electrical service outlet receptable.]

[23. The flow control of claim 22 comprising: an electrical connector means accessible from the exterior of said flow control casing; and means connecting said connector means in parallel with the said valve actuator of said fluid flow valve, whereby without requiring access to the interior of said casing, a further fluid flow controlling or effecting device can be connected to said valve operating means for energizing and de-energizing said device coterminously with the energization and de-energization of said valve actuator.]

[24. The flow control of claim 23 wherein the said flow control casing is attached to one extremity of a vertical, cylindrical stanchion by means of a cylindrical cap; exterior flat circular surface of said cap centrally abutts, and is attached to, the exterior surface of the said bottom cover; a center hole extends from said bottom cover interior surface to the interior surface of said cap; a hermetically sealed bushing is placed in said hole; cylindrical wall interior surface of said cap is telescoped over exterior surface at one extremity of said vertical stanchion, thereby, providing means for supporting said flow control casings; and said multiple-conductor cable enters said flow control casing through said sealed bushing, and through a slotted opening at one extremity of said stanchion, said opening abutting peripheral extremity of said cap.]

[25. The flow control of claim 24 wherein a diametric hole extends continuously through the telescoped together contiguous walls of the said cap and the said vertical cylindrical stanchion extremity; extended through said diametric hole, a section of solid cylindrical rod having a circular flanged head at one extremity thereof, and a hole located diametrically through the said rod at the opposite extremity thereof; and a padlock shackle passed through the said diametric hole of the said rod, thereby locking said rod in place and preventing theft of the said flow control.]

[26. The flow control of claim 24 in combination with a time delay relay disposed in the interior of said flow control casing, comprising: said time delay relay having an actuator and a single movable pole, double contact, switch comprising a first and second contact; said timer switch, said valve actuator, said mode switch first contact and said step-down transformer secondary, all connected in series with said relay first contact; when said timer switch, said mode switch first contact and said relay first contact are closed said valve actuator is energized and said valve is opened; said relay first contact opens, and said relay second contact closes, at the end of a given first predetermined time interval or delay, afer said relay actuator is energized, thereby, providing a said first predetermined time delay between said relay actuator energization and said valve actuator de-energization; and said relay first contact closes, and said relay second contact opens immediately upon de-energization of said relay actuator, thereby, causing immediate de-energizing of the said valve actuator when said relay actuator is de-energized.]

[27. The flow control of claim 26 wherein the length of the said first predetermined time interval is adjustable.]

[28. The flow control of claim 27 wherein the said relay actuator, relay actuator conductor means and the said step-down transformer secondary are all connected in series with a planimetric rain switch, comprising: an insulating member having a surface which is adapted to be oriented to receive rain, thereon, and first and second spaced apart conductor means on said surface connected to said relay actuator conductor means, which are adapted to be electrically connectedd by precipitation on said insulating surface and, thereby, complete the continuity of the said relay actuator and said transformer secondary circuit, causing the said relay actuator to be energized, said relay first contact to open, said valve actuator to be de-energized, and said valve to close; upon cessation of said precipitation, said spaced apart conductor means continuity is interrupted causing said relay actuator to be de-energized, said relay first contact to close, said valve actuator to be energized, and said valve to open; said planimetric rain switch disposed on the exterior surface of said frustoconical top cover flat surface angularly mounted in the interior of a section of right circular cylinder, one peripheral extremity of which abutts the peripheral extremity of a rigid wire screen disc, and the opposite peripheral extremity of said cylinder is supported parallel to, and spaced slightly apart from said top cover exterior surface, enabling precipitation to enter said cylinder interior through said screen, impinge upon said insulating surface of said planimetric rain switch, gravity flow from said insulating surface, and exit from between said last mentioned right circular cylinder peripheral extremity and said top cover exterior surface; said spaced apart conductor means on said rain switch insulating surface connected to said relay actuator conductor means by means of a hermetically sealed rain switch cable extending from said spaced apart conductors through the said frustoconical cover flat surface by means of a hermetically sealed bushing that extends from the exterior surface to the interior surface of the said frustoconical cover; and said rain switch cable extending radially along the interior surface of the said frustoconical cover and perpendicular to said hinge axis, extending through the said panel by means of a second said hermetically sealed bushing that extends from the exterior surface to the interior surface of the said panel.]

[29. The flow control of claim 28 wherein the said rain switch cable is formed into a coil comprising several turns; peripheral plane of said coil is orthogonal to the axis of said rain switch cable and said coil is formed in a fully contracted position wherein each said turn is congruent with, and consecutively contiguous to the preceeding said turn; said coil is located adjacent to, and perpendicular to, the said hinge axis at the juncture of said top cover and said panel, and axis of said coil is perpendicular to exterior surface of said panel; when the peripheral extremity of the said top cover circumferentially abutts the said panel peripheral flange, said coil is in a fully contracted position; when said top cover is rotated, with respect to said panel, to the said predetermined maximum limit, and coil is in a fully expanded position, providing a flexible expansion cable pivot between the said top cover and the said panel; and protecting said rain switch cable from flexure breakage when said top cover is repeatedly opened and closed.]

[30. The flow control of claim 29 in combination with an audio-visual rain alarm remotely connected to said flow control by means of an alarm extension cable, said rain alarm housed in an alarm casing, comprising: an electrically actuated audible buzzer, visual indicator light and a double pole, three position, rain alarm selector switch; said relay second contact connected in series with a first conductor, at a first extremity of said alarm cable, and one terminal of said step-down transformer secondary coil; a second conductor at said first extremity of said alarm cable connected to remaining terminal of said step-down transformer secondary, thereby providing said source of low operating voltage to said rain alarm when said time delay relay second contact is closed; opposite extremity of said alarm cable terminated in said alarm casing with a first conductor from said opposite extremity connected to each pole terminal of said alarm switch, a second conductor from said opposite extremity of said alarm cable connected to one terminal of said buzzer coil and to one terminal of said visual indicator light, opposite terminals of said buzzer coil and said visual indicator light each connected to a terminal of one pair of said alarm switch terminals providing said switch continuity when said alarm switch is in a first position, said visual indicator light opposite terminal also connected to one terminal of a third pair of said alarm switch terminals providing said switch continuity when said alarm switch is in a third position, and a second pair of said alarm switch terminals are disconnected providing no said switch continuity when the said alarm switch is in a second position; and thereby providing during rainfall, a simultaneous audible and visual alarm when said alarm switch is in said first position, no alarm when said alarm is in said second position, and a visual alarm when said selector switch is in said third position.]

[31. The flow control of claim 30 wherein the said time delay relay comprises: time delay means causing said first contact to open and said second contact to close at the end of the said first given predetermined time interval after the said switch actuator is energized; and said time delay means causing said first contact to close and said second contact to open at the end of a second given predetermined time interval after the said switch actuator is de-energized.]

[32. The flow control of claim 31 wherein the length of the said first predetermined time interval and the length of the said second predetermined time interval are adjustable.]

[33. A flow control for a flow control system, comprising: a main casing member that is of right circular cylindrical configuration, a bottom cover fitted into and fixed to said casing member at one end thereof, a top cover affixed to and closing said casing member at the opposite end thereof, said bottom cover having a flat portion spanning said main casing member with a flange around the periphery on said bottom cover flat portion abutting that interior of said main casing member, and said top cover having a flat portion spanning said main casing member with a flange around the periphery of said top cover flat portion, peripheral extremity of said top cover flange in contiguous circumferential abuttment with the peripheral extremity of said main casing member; inserted contiguously between the said top cover flange peripheral extremity and the said main casing member peripheral extremity, a continuous annular gasket, the said top cover flange peripheral extremity is sandwiched circumferentially into the upper annular face of the said gasket, and the opposite annular face of the said gasket is telescoped over the said main casing member peripheral extremity, thereby providing a hermetic seal between the exterior surface of said panel and the interior surface of said main casing member; a fluid flow valve with an electrically operated actuator housed in said casing, said actuator being operable on voltage available at an electric power source located external of said casing; a single electrical conductor means extending from the interior to the exterior of said casing for connecting said valve actuator to said external electrical power source; manually manipulatable connection means disposed on the exterior side of said casing to which fluid supply and delivery means can be coupled; and means providing fluid communication from said connection means through said casing means to the inlet and outlet of said fluid flow valve.]

[34. The flow control of claim 33 wherein the said fluid communication means comprise: an inlet pipe fitting between said connection supply means and said valve inlet, and an outlet pipe fitting between said valve outlet and said connection delivery means; said inlet pipe fitting and said outlet pipe fitting of conventional plumbing type with an annular shoulder flange at both inlet port and outlet port of each said fitting; said outlet port, of said inlet fitting, attached to said valve inlet, and said inlet port of said inlet fitting attached to, and protruding through, said bottom cover; said inlet port of said outlet fitting attached to said valve outlet, and said outlet port, of said outlet fitting, attached to, and protruding through, said bottom cover; said inlet port shoulder flange of said inlet fitting, and said outlet port shoulder flange of said outlet fitting, partially removed by undercutting to provide for each said flange a cylindrical tube of reduced outside diameter with one extremity of each said cylindrical tube concentrically orthogonal to and abutting remaining portion of each said shoulder flange; an annular hermetic seal placed concentrically over each said cylindrical tube, of said reduced outside diameter, and abutting circumferentially the annular face of the said remaining portion of the said shoulder flange on the said inlet port of said inlet fitting and on said outlet port of said outlet fitting; said flow valve, said inlet fitting, said outlet fitting and said annular hermetic seals assembled on said bottom cover interior surface, each said cylindrical tube extending through a circular hole in said bottom cover, thereby, sandwiching said annular gasket between said annular faces of said remaining shoulder flanges and the said bottom cover; each said cylindrical tube having an annular slot undercut on the outside surface of said tube adjacent to the said bottom cover exterior surface; a spring tensioned, beveled, annular snap ring inserted into each said undercut slot and circumferentially gripping each said cylindrical tube; each said beveled snap ring exerting force against said bottom cover exterior surface, thereby, compressing each said annular seal between each said undercut shoulder flange and said bottom cover interior surface, causing a hermetic seal between said bottom cover exterior surface and said bottom cover interior surface; and causing said valve and said fluid communication means to be self supporting on said bottom cover.]

[35. The flow control of claim 34 wherein the said flow control casing is attached at one extremity of a vertical, cylindrical, stanchion by means of a cylindrical cap; exterior flat circular surface of said cap centrally abutts and is attached to, the exterior surface of the said bottom cover; a center hole extends from said bottom cover interior surface to the interior surface of said cap; a hermetically sealed bushing is placed in said hole; cylindrical wall interior surface of said cap is telescoped over exterior surface at one extremity of said vertical stanchion, thereby, providing means for supporting said flow control casing; and said single conductor means enters said flow control casing through said sealed bushing, and through a slotted opening at one extremity of said stanchion, said opening abutting peripheral extremity of said cap.]

[36. The flow control of claim 35 in combination with a time delay relay disposed in the interior of said casing, comprising: an electrically actuated single pole, single contact, switch with a relay switch actuator which, when energized, causes said contact to open and when de-energized causes said contact to close; time delay means causing said contact to open at the end of a given predetermined time interval after the said relay actuator is energized; means to close the said contact immediately following de-energization of the said relay actuator; said contact connected in series with said valve actuator, said electrical conductor means, and said power source; when said contact is open said valve actuator is interrupted causing said valve to close; and when said contact is closed said valve actuator is energized by said electrical conductor means and said power source causing said valve to open.]

[37. The flow control of claim 36 wherein the said switch actuator, and said power source are all connected in series with a planimetric rain switch, comprising: an insulating member having a surface which is adapted to be oriented to receive rain thereon, and first and second spaced apart conductor means, on said surface, connected in series with said power source and said relay actuator; said spaced apart conductor means adapted to be electrically connected by precipitation on said insulating surface thereby completing the continuity of said relay actuator and said power source series circuit causing said relay actuator to be energized, opening said contact, deenergizing said valve actuator, and closing said valve; upon cessation of said precipitation said spaced apart conductor means continuity is interrupted, causing said series circuit continuity to be interrupted, de-energizing said relay actuator, closing said contact, energizing said valve actuator, and opening said valve; said planimetric rain switch disposed on the exterior surface of said top cover, angularly mounted in the interior of a section of right circular cylinder, one peripheral extremity of which abutts the peripheral extremity of a rigid wire screen disc and the opposite peripheral extremity of said cylinder is supported parallel to, and slightly apart from said top cover exterior surface enabling precipitation to enter said cylinder interior through said screen, impinge upon said insulating surface of said planimetric rain switch, gravity flow from said insulating surface, and exit from between last mentioned said right circular cylinder peripheral extremity and said top cover exterior surface; and said spaced apart conductor means on said rain switch insulating surface connected into the said relay actuator, and said power source series circuit, by means of a hermetically sealed cable extending from said spaced apart conductors through the said top cover by means of a hermetically sealed bushing that extends from the exterior surface to the interior surface of the said top cover.]

[38. A flow control for a flow control system comprising: a casing having a main frustoconical casing member the tapered peripheral extremity of which circumferentially abuts the peripheral extremity of a flat bottom cover thereby enclosing the bottom of said main frustoconical member, and the opposite peripheral extremity of said frustoconical member circumferentially abuts one peripheral extremity of a section of right circular cylinder and is contiguously attached thereto, a panel affixed to and closing said right circular cylinder section at the opposite end thereof, said panel having a flat portion spanning said frustoconical member with a flange around the periphery of said panel flat portion, peripheral extremity of said panel flange in contiguous circumferential abuttment with the peripheral extremity of said right circular cylinder; inserted contiguously between the said panel flange peripheral extremity and the said main casing member peripheral extremity a continuous annular gasket, the said panel flange peripheral extremity is sandwiched circumferentially into the upper annular face of the said gasket, and the opposite annular face of the said gasket is telescoped over the said main casing member peripheral extremity thereby providing a heremetic seal between the exterior surface of said panel and the interior surface of the said main frustoconical casing member; a top cover comprising a frustoconical portion and a cylindrical portion the peripheral extremity of which is telescoped over the exterior surface of the said panel peripheral flange and abutts circumferentially the said upper annular face of the said annular gasket thereby providing a heremetical seal between the exterior surface of the said top cover and the exterior surface of the said panel; a fluid flow valve attached to exterior of said casing with an electrically operated actuator housed in said casing, said actuator being operable on voltage available at an electrical power source located externally of said casing; valve operating means in said casing for energizing and de-energizing the valve actuator to open and close the valve thereby control the flow of fluid therethrough, said valve operating means comprising a timer having a switch and switch operating means for opening and closing said switch in an automatic repetative cycle; a single electrical conductor means extending from the interior to the exterior of said casing for connecting said valve operating means to said external electrical power source; conductors in said casing connecting said valve actuator to said conductor means in series with said switch and for connecting said conductor means to said switch operating means; and manually manipulatable connection means disposed on the exterior side of said casing to which fluid supply and delivery means can be coupled.]

[39. The flow control unit of claim 38 in combination with a hinge connecting the said top cover to the said frustoconical main casing member wherein: leaves of said hinge span the said annular gasket and the longitudinal pivot axis of the said hinge is located with respect to the said top cover and the said annular gasket to minimize the distance between peripheral extremity of said top cover and said upper annular face of said gasket when the said top cover is rotated to its maximum open position; means for attaching said hinge to cylindrical surface of said main casing member and to cylindrical surface of said top cover wherein said hinge leaves are longitudinally arced while said hinge axis is longitudinally straight and parallel to axis of said hinge leaves; and means to limit angular movement of said hinged top cover with respect to said main casing to a predetermined maximum limit by disposition of a mechanical limit on one leaf of said hinge, the extent of the angular rotation of the juxtapositional said hinge leaf being determined by the said mechanical limit.]

[40. The combination of claim 39 wherein the said hinge is spring loaded causing the said top cover peripheral extremity to abutt the said upper annular face of the said annular gasket providing a hermetic seal between the said exterior surface of the said top cover and the exterior surface of the said panel.]

[41. The combination of claim 40 wherein a draw pull catch is disposed on the exterior surface of the said frustoconical main casing at a point that is diametrically opposite the said hinge, a strike is disposed on the exterior surface of the said top cover; the loop of the said draw pull catch spans the said annular gasket and engages the said strike; causes the said top cover to hermetically seal to the said upper plane of the said annular gasket when said draw pull catch is actuated; and means wherein said draw pull catch may be locked in a closed or in an open position.]

[42. The flow control of claim 41 wherein the said timer is disposed upon and supported by the said panel; said timer means and said timer switch operating means disposed on the exterior surface of said panel being non-electrical; said timer means, said time switch, and said timer operating means disposed on the interior surface of said panel, being electrical; said timer operating means, disposed on the interior surface of said panel motivating the said timer disposed on the exterior surface of said panel, by means of a single rotating drive shaft that protrudes through a hermetically sealed bushing extending from said panel interior surface to said panel exterior surface; and said timer switch operating means disposed on said panel exterior surface actuating said timer switch operating means and said timer switch, disposed on said panel interior surface, by means of an angularly oscillating drive shaft means protruding through a hermetically sealed bushing extending from said panel interior surface to said panel exterior surface.]

[43. The flow control of claim 42 in combination with a three position mode control switch disposed on the said panel; in one position said mode control switch connects said valve actuator to said valve operating means causing the opening and closing of said valve to be controlled by said timer; in a second position said mode control switch disconnects said valve actuator from said valve operating means thereby making said valve actuator inoperative; in a third position said mode control switch overrides said valve operating means and connects said valve actuator directly to said single electrical conductor means, extending said external electrical power to said casing interior, thereby actuating said valve actuator; and said mode control switch is disposed on said panel interior surface and is actuated by mechanical control means protruding through a hermetically sealed bushing extending from said panel interior surface to said panel exterior surface.]

[44. The flow control of claim 43 wherein the said valve actuator is housed in the interior of said frustoconical main casing member, said valve actuator axis disposed perpendicular to the interior surface of said bottom cover and the valve main housing is attached to the exterior surface of said bottom cover; perpendicularly attached, permanently, and hermetically sealed to a main housing of said valve, is a cylindrical valve actuator stem; said valve actuator stem comprising means for opening said valve when said valve actuator is energized, and means for closing said valve when said valve actuator is de-energized; said valve actuator stem protruding perpendicularly from said bottom cover exterior surface into said frustoconical main casing interior, and said valve actuator comprising a concentric cylindrical electro magnetic coil, the cylindrical axial cavity of which is telescoped over said valve actuator stem; a heremetic seal sandwiched contiguously between the exterior surface of said bottom cover and the exterior surface of said valve main housing, said valve actuator stem protruding through said seal and said bottom cover, said seal providing a hermetic seal between the exterior and interior of said main casing member; and said manually manipulatable connection means, to which said fluid supply and delivery means can be coupled, are attached to the said valve main housing.]

[45. The flow control of claim 44 wherein said single electrical conductor means extends from the interior to the exterior of said flow control casing for connecting said valve operating means to said external power source, said single electrical conductor means comprising: a hermetically sealed multiple-conductor cable extending remotely from said casing to said external electrical power source; one extremity of said cable having a grounded conductor connected to said casing, additional conductors connected to said valve operating means in said casing interior, and the opposite extremity of said cable connected to said electrical power source by means of a hermetically sealed electrical plug casing; said plug casing provided with a conventional hermetically sealed 3-pin grounded plug that plugs into a conventional grounded electrical service outlet receptacle, thereby, connecting said valve operating means to said external electrical power source; a step-down transformer mounted in the interior of said plug casing, primary leads of said transformer connected to line pins of said 3-pin grounded plug, and secondary leads of said transformer connected to conductors in said multiple-conductor cable thereby providing a source of low operating voltage to said valve operating means; ground pin of said 3-pin grounded plug connected to said plug casing and to conductor in said multiple-conductor cable; said step-down transformer coil core frame extended through and protruding from said plug casing exterior surface and, thereon, attached to cooling fins which radiate heat generated by said transformer; one extremity of said multiple-conductor plug extension cable terminated in said casing, and opposite extremity thereof, terminated in said plug casing by means of moulded strain relief terminations which provide a hermetic seal between exterior surface of said multiple-conductor cable and interiors of both the said casing and the said plug casing; and a thin disc of low durometer hermetic sealing material spanning exterior surface face of said 3-pin grounded plug, said three pins extending therethrough, providing a hermetic seal between exterior surface of said plug casing and interior of said electrical service outlet receptable.]

[46. The flow control of claim 45 wherein said manually manipulatable connection means disposed on the exterior side of said casing to which fluid supply and delivery means are coupled, comprise: a rigid tubular fluid extension conduit, one extremity of which is attached to the fluid inlet on said valve main housing, and a fluid swivel connector is attached to the opposite end of the said fluid extension conduit; said fluid swivel connector adapted to be affixed to the outlet of a conventional outdoor mounted water faucet; and the fluid outlet on said valve main housing providing said fluid delivery means, for connection to a flexible fluid conduit.]

[47. The flow control of claim 46 in combination with a time delay relay disposed in the interior of said flow control casing; said time delay relay having an actuator and a single movable pole, double contact, switch comprising a first and second contact; said timer switch, said valve actuator, said mode switch first contact and said step-down transformer secondary, all connected in series with said relay first contact; when said timer switch, said mode switch first contact and said relay first contact are closed, said valve actuator is energized and said valve is opened; said relay first contact opens, and said relay second contact closes, at the end of a given first predetermined time interval or delay, after said relay actuator is energized, thereby, providing a said first predetermined time delay between said relay actuator energization and said valve actuator de-energization; and said relay first contact closes, and said relay second contact opens immediately upon de-energization of said relay actuator, thereby, causing immediate de-energizing of the said valve actuator when said relay actuator is de-energized.]

[48. The flow control of claim 47 wherein the length of the said first predetermined time interval is adjustable.]

[49. The flow control of claim 48 wherein the said relay actuator conductor means and the said step-down transformer are all connected in series with a planimetric rain switch, comprising: an insulating member having a surface which is adapted to be oriented to receive rain, thereon, and first and second spaced apart conductor means on said surface connected to said relay actuator conductor means, which are adapted to be electrically connected by precipitation on said insulating surface and, thereby, complete the continuity of the said relay actuator and said transformer secondary circuit, causing the said relay actuator to be energized, said relay first contact to open, said valve actuator to be de-energized, and said valve to close; upon cessation of said precipitation, said spaced apart conductor means continuity is interrupted causing said relay actuator to be de-genergized, said relay first contact to close, said valve actuator to be energized, and said valve to open; said planimetric rain switch disposed on the exterior surface of said frustoconical top cover flat surface angularly mounted in the interior of a section of right circular cylinder, one peripheral extremity of which abutts the peripheral extremity of a rigid wire screen disc, and the opposite peripheral extremity of said cylinder is supported parallel to, and spaced slightly apart from said top cover exterior surface, enabling precipitation to enter said cylinder interior through said screen, impinge upon said insulating surface of said planimetric rain switch, gravity flow from said insulating surface, and exit from between said last mentioned right circular cylinder peripheral extremity and said top cover exterior surface; said spaced apart conductor means on said rain switch insulating surface connected to said relay actuator conductor means by means of a hermetically sealed rain switch cable extending from said spaced apart conductors through the said frustoconical cover flat surface by means of a hermetically sealed bushing that extends from the exterior surface to the interior surface of the said frustoconical cover; and said cable extending radially along the interior surface of said cover, perpendicular to said hinge axis, and through said panel via a hermetically sealed bushing therein.]

[50. The flow control of claim 49 wherein the said rain switch cable is formed into a coil comprising several turns; peripheral plane of said coil is orthogonal to the axis of said rain switch cable and said coil is formed in a fully contracted position wherein each said turn is congruent with, and consecutively contiguous to the preceeding said turn; said coil is located adjacent to, and perpendicular to, the said hinge axis at the juncture of said top cover and said panel, and axis of said coil is perpendicular to exterior surface of said panel; when the peripheral extremity of the said top cover circumferentially abutts the said panel peripheral flange, said coil is in a fully contracted position; when said top cover is rotated, with respect to said panel, to the said predetermined maximum limit, said coil is in a fully expanded position, providing a flexible expansion cable pivot between the said top cover and the said panel; and protecting said rain switch cable from flexure breakage when said top cover is repeatedly opened and closed.]

[51. The flow control of claim 50 wherein the said planimetric switch, said right circular cylindrical section, and said wire screen comprise a rain switch housing; said rain switch housing is disposed on the exterior surface of said top cover flat portion; a limited arc segment of said opposite peripheral extremity of said cylinder is hinged contiguously to exterior surface of said top cover; said hinge axis is tangential to said opposite peripheral extremity of said cylinder and is parallel to said top cover flat portion; said rain switch housing is rotatable about said hinge axis thereby providing for variable selection of the angle formed between the said top cover flat portion and the plane of the said cylinder opposite peripheral extremity; and means for securing said rain switch housing at any desired value of said angle.]

[52. The flow control of claim 51 wherein the said time delay relay comprises: time delay means causing said first contact to open and said second contact to close at the end of the said first given predetermined time interval after the said switch actuator is energized; and said time delay means causing said first contact to close and said second contact to open at the end of a second given predetermined time interval after the said switch actuator is de-energized.]

[53. The flow control of claim 52 wherein the length of the said first predetermined time interval and the said second predetermined time interval are adjustable.]

*54. A flow control for a fluid flow system having a fluid conduit with a flow control valve therein, said flow control valve having an electrically operated valve actuator means and said flow control comprising: a first circuit means for connecting a source of operating voltage to said valve actuator means; a first switching means comprising timing means for automatically completing said first circuit means to energize said valve actuator means and thereby open said valve and allow flow of fluid through said conduit for a predetermined period of time, and upon completion of said time period, for interrupting said first circuit means, causing said valve actuator means to be de-energized and said valve to close, thereby terminating flow through said conduit; a second switching means which, when energized, interrupts the continuity of said first circuit means, thereby overriding said first switching means and de-energizing said valve actuator means, thus causing said valve to open and terminate fluid flow through said conduit and which, upon de-energization of said switch actuator means, restores control of said first switching means over said valve actuator means, completing continuity of said first circuit means and energizing said valve actuator means, causing said valve to open and said fluid to flow therethrough, said second switching means comprising a switching means with an electrically operated actuator means; a third circuit means comprising, in series, said switch actuator means, third circuit conductor means, said source of operating voltage, and moisture sensitive switching means which, when closed, completes continuity of said third circuit means and which, when open, interrupts continuity of said third circuit means; said moisture sensitive switching means are adapted to be electrically connected by the presence of rain on said moisture sensitive switch, thereby completing the continuity of said third circuit means, energizing said switch actuator means, overriding said first switching means, interrupting said first circuit means, de-energizing said valve actuator means, closing said valve, and terminating fluid flow therethrough; said means which are adapted to be electrically connected by the presence of rain on said moisture sensitive switching means being further adapted, concomitantly with the subsequent absence of rain thereon, to interrupt said third circuit means, thereby de-energizing said switch actuator means and restoring control of said valve actuator means to said first switching means; and when said second switching means is energized, said source of operating voltage energizes a second circuit means providing said source of operating voltage for ancillary control when said moisture switch is activated and said first circuit means is interrupted.*

*55. The flow control of claim 54 wherein said second switching means comprises time delay means for causing said first circuit means to be interrupted and said second circuit means to be energized at the end of a given predetermined time interval after said moisture sensitive switching means is activated; and said time delay means restores continuity to said first circuit means and removes said source of operating voltage from said second circuit means immediately upon deactivation of said moisture sensitive switching means.*

*56. A flow control according to claim 55 which includes means for adjusting said predetermined time interval.*

*57. A flow control according to claim 54 which has a third switching means incorporated in said first circuit means and providing an automatic mode of operation in which said valve actuator means are energized by said first and second switching means, an inoperative mode of operation in which said valve actuator means is disconnected from said first circuit means, and a manual mode of operation in which said valve actuator means is electrically connected directly to said source of operating voltage, whereby in said automatic mode of operation said fluid flow through said valve is programmed by said first switching means subject to being overridden by said second switching means; in said inoperative mode said source of operating voltage cannot activate said valve actuator means; and in said manual mode of operation said source of operation voltage is provided manually to said valve actuator means thereby manually controlling flow of fluid through said valve.*

*58. A flow control according to claim 57 which includes rain alarm means and means for energizing said rain alarm means during periods of rainfall and for the duration thereof.*

*59. A flow control according to claim 54 which has a three-position fourth switching means, an alarm, for so energizing that it provides a simultaneous audible and visual alarm signal during rainfall when said fourth switching means is in a first position; no alarm signal during rainfall when said fourth switching means is in a second position; and a visual alarm signal only, during rainfall, when said fourth switching means is in a third position.*

*60. The combination of a flow control as defined in claim 54 and a step-down voltage means for supplying a reduced operating voltage to said control, said step-down voltage means comprising: a hermetically sealed plug casing; a step-down voltage circuit means housed in said casing; electrical contacts protruding through said plug casing and adapted to be plugged into an electrical service outlet receptacle; means in said casing connecting said electrical contacts to said step-down voltage circuit means; and means extending through said hermetically sealed casing and an extension cable for connecting step-down voltage circuit means to said first circuit means of said flow control.*

*61. The combination of claim 60 wherein said step-down voltage circuit means comprises a step-down transformer having coil means wound and supported on a coil core frame that is integral with the plug casing; wherein at least the exterior portion of said plug casing is constructed of electrically insulating material; and wherein said coil core frame is constructed of a thermally conductive material and protrudes through said plug casing, thereby causing heat generated by said step-down transformer to be radiated away from said plug casing.*

*62. The combination of claim 61 wherein said step-down transformer is of the grounded-barrier type and wherein said grounded barrier is electrically connected to said coil core frame and to said plug casing.*

*63. A flow control according to claim 54 which has means for controlling an additional fluid flow controlling or effecting device, comprising: a fourth circuit means and a remote flow device actuator means coupled to said flow device, said fourth circuit means being connected in parallel with said first circuit means; and said remote flow device actuator means being electrically connected to said fourth circuit means, thereby causing said remote flow device actuator means to be energized and de-energized substantially coterminously with the energization and de-energization of said valve actuator means.*

*64. A control for a flow control system or the like, comprising: a casing having a main member of cylindrical configuration, a bottom cover fixed to said main member at one end thereof, and a panel affixed to and closing said main casing member at the opposite end thereof, said bottom cover having a portion spanning said main casing member and a flange around its periphery abutting the periphery of said main casing member, and said panel having a portion spanning said main casing member and a peripheral flange in contiguous abutment with the main casing member; a top cover having a frustroquadric portion and a cylindrical portion of which is telescoped over said peripheral panel flange and provides a closure between said top cover and the exterior of said panel; a fluid flow valve with an inlet and an outlet and an electrically operated actuator housed in said casing, said actuator being adapted to be operated from a voltage source located external of said casing; valve actuator operating means in said casing for energizing and de-energizing said valve actuator to open and close said valve and thereby control flow of fluid therethrough; electrical conductor means extending from the interior of said casing therethrough to said external electrical power source; circuit means in said casing for connecting conductor means to said valve actuator means and said valve actuator operating means; manually manipulatable connection means disposed on the exterior side of said casing to which fluid supply and delivery means can be coupled; and means providing fluid communication from said connection means to the inlet and outlet of said fluid flow valve.*

*65. A flow control unit according to claim 64 which includes a hinge for rotatably connecting said top cover to said main casing member and means for attaching said hinge to said main casing member and to said top cover, said hinge having leaves which are longitudinally arced while the axis of said hinge is longitudinally straight and parallel to at least one axis of said hinge leaves; and stop means incorporated in said hinge for limiting the annular movement of said hinged top cover with respect to said main casing to a predetermined maximum limit.*

*66. A flow control according to claim 65 which has means for spring loading said hinge so as to cause said top cover to abut said main casing member in a manner providing a hermetic seal between said top cover and said panel.*

*67. A flow control according to claim 65 which has a draw pull catch fixed to the exterior of said main casing at a point that is diametrically opposite said hinge and a strike fixed to the exterior of said top cover, said draw pull catch having a loop so engagable with said strike as to displace said top cover into hermetically sealed relationship with said main casing member.*

*68. A flow control according to claim 64 which includes a timer means for controlling said valve actuator means and said fluid flow valve according to a selectable pro-*

*grammed time sequence; said timer means being fixed to said panel in a hermetically sealed chamber defined by said panel and said main casing member; and a mechanical, selectable program timer means being accessible by displacing said top cover relative to said main casing member.*

*69. A flow control according to claim 68 which has a rotating drive shaft for connecting said selectable program timer operating means to said timer means which extends through said panel, a timer switch operating means fixed to the exterior of said panel, a timer switch in said hermetically sealed chamber, an angularly oscillating drive shaft means extending through said panel and connecting said timer switch operating means to said timer switch, and bushings surrounding said shafts and providing a hermetically sealing relationship between said shafts and said panel.*

*70. A flow control according to claim 64 which has a three position mode control switch fixed on said panel for effecting automatic control of said fluid flow valve by said selectable program timer operating means when said mode switch is in an automatic position, manual control of said valve when said mode switch is in a manual position, and disconnecting said valve actuator means from said valve actuator conductor means when said mode switch is in an off position; and said mode control switch being accessible by displacement of said top cover relative to said main casing member.*

*71. A flow control according to claim 64 wherein said fluid flow valve is fixed to said bottom cover and wherein said fluid communication means comprises an inlet fitting between said connection supply means and said valve inlet and an outlet fitting between said valve outlet and said connection delivery means.*

*72. The flow control of claim 64 wherein said electrical conductor means comprises a cable extending in hermetically sealed relationship through said casing to said external electrical power source; one extremity of said cable being electrically connected to said valve operating means and the opposite extremity of said cable terminating in a plug having: a hermetically sealed casing, electrical contacts adapted to be plugged into a conventional electrical service outlet receptacle to thereby electrically connect said cable to said external electrical power source; and a step-down voltage circuit means housed in the plug casing and electrically connected between said contacts and said multiple-conductor cable for making a low operating voltage available to said valve operating means.*

*73. The flow control of claim 64 comprising: an electrical connector means accessible from the exterior of said flow control casing and means connecting said connector means in parallel with said valve actuator means, whereby a further fluid flow controlling or effecting device can be so connected to said valve operating means as to energize and de-energize said device coterminously with the energization and de-energization of said valve actuator means and without requiring access to the interior of said casing.*

*74. A flow control according to claim 64 comprising means for supporting said flow control casing from one extremity of a vertical, stanchion which includes a downwardly opening female cap attached to said bottom cover and adapted to be telescoped over said one extremity of said vertical stanchion.*

*75. The flow control valve of claim 64 wherein said manually manipulatable connection means comprises an inlet fitting and an outlet fitting, said inlet fitting and said outlet fitting each have an inlet port and an outlet port defined by a shouldered flange; the outlet port of said inlet fitting being attached to said valve inlet and the inlet port of said inlet fitting being attached to, and protruding through, said bottom cover; the inlet port of said outlet fitting being attached to said valve outlet and the outlet port of said outlet fitting being attached to, and protruding through, said bottom cover; and fastener means engaging the inlet port defining flange of the inlet fitting and the outlet port flange of the outlet fitting and the exterior side of the bottom cover to thereby fix said valve and said fluid communication means to said cover.*

*76. The combination of a stanchion and a flow control according to claim 64, there being communicating, hermetically sealed openings through said bottom cover and said top cover of the flow control main casing and a communicating opening at said one extremity of said stanchion through which said conductor means can be introduced into the chamber in said main casing.*

*77. A flow control according to claim 64 which includes a selectable program timer means for controlling the operation of said valve actuator means and said valve actuator operating means via said circuit means and a moisture sensitive rain switch for activating a time delay actuator means and thereby causing a relay means to override said selectable program timer means and cause said valve actuator means to open said valve at a predetermined time interval after activation of said rain switch; said rain switch having an insulating member with a surface which is adapted to be oriented to receive rain thereon and spaced apart conductor means on said surface which are adapted to be electrically connected by precipitation on said insulating surface to connect said external power source to said time delay actuator means; said moisture sensitive rain switch being disposed on the exterior surface of said frustoquadric top cover.*

*78. A flow control according to claim 77 together with a housing for said rain switch which comprises an upwardly opening main housing member spaced above said frustoquadric top cover and a perforate, protective cover spanning the open end of said main housing member, said rain switch being disposed at an angle to the horizontal in said housing, whereby rain can enter said housing through said protective cover, impinge on said rain switch, flow by gravity off the insulating surface thereof, and exit from said housing through the space between said main housing member and said top cover.*

*79. A flow control according to claim 78 which includes a rain switch cable extending from said spaced apart rain switch conductors means through said frustoquadric cover, radially along the interior surface of the said frustoquadric cover, and then through said panel to electrically connect said rain switch to said valve operating means; and means surrounding said cable for hermetically sealing the openings in said cover and said panel through which said cable passes.*

*80. A flow control according to claim 79 wherein said rain switch cable is formed into a contracted coil which has its peripheral plane orthogonal to the axis of said rain switch cable; said coil being located adjacent, and perpendicular, to a hinge axis at the juncture of said top cover and said panel, and the axis of said coil being perpendicular to said panel when the peripheral extremity of the said top cover is abutted with said panel, said coil thereby being so oriented as to be rotated relative to said panel and extended to protect it from flexure breakage when said top cover is opened and closed.*

*81. A flow control for a flow control system comprising: a casing having a main, frustoquadric casing member, a bottom cover, and a panel, said main casing member hav-*

*ing a tapered portion which circumferentially abuts said bottom cover, thereby enclosing the bottom of said main frustoquadric member and a cylindrical portion, said panel being affixed to and spanning said main casing member and having a flange in contiguous circumferential abutment with the cylindrical portion of said main casing member which provides a seal between said panel and said main casing member; a top cover comprising a frustoquadric portion and a cylindrical portion which is telescoped over said panel and abuts said casing, thereby providing a seal between said top cover and said panel; a fluid flow valve with an electrically operated actuator means integrated with said casing; an electrical, valve operating means in said casing for energizing and de-energizing said valve actuator means to open and close said valve and thereby control the flow of fluid therethrough; electrical conductor means extending from the interior to the exterior of said casing for connecting said valve operating means to an external electrical power source; circuit means in said casing for connecting said valve actuator means and said valve operating means to said conductor means; and manually manipulatable connection means accessible from the exterior of said casing to which fluid supply and delivery means can be coupled.*

*82. A flow control according to claim 81 which includes a hinge for rotatably connecting said top cover to said main casing member and means for attaching said hinge to said main casing member and to said top cover, said hinge having leaves which are longitudinally arced while the axis of said hinge is longitudinally straight and parallel to at least one axis of said hinge leaves; and stop means incorporated in said hinge for limiting the annular movement of said hinged top cover with respect to said main casing.*

*83. A flow control according to claim 82 which has means for so spring loading said hinge as to cause said top cover to abut said main casing member in a manner providing a hermetic seal between said top cover and said panel.*

*84. A flow control according to claim 82 which has a draw pull catch fixed to the exterior of the main casing at a point that is diametrically opposite said hinge and a strike fixed to the exterior of said top cover, said draw pull catch having a loop so engagable with said strike as to displace said top cover into hermetically sealed relationship with said main casing member.*

*85. A flow control according to claim 81 which includes a timer means for controlling said valve actuator means and said fluid flow valve according to a selectable programmed time sequence, said timer means being fixed to said panel in a hermetically sealed chamber defined by said panel and said main casing member; and a mechanical, timer-operating, selectable program, timer means for controlling the operation of said timer means, said timer-operating, selectable program, timer means being electrically insulated from said timer means and accessible by displacing said top cover relative to said main casing member.*

*86. A flow control according to claim 85 which has a rotating drive shaft for connecting said timer operating means to said timer means which extends through said panel, a timer switch operating means fixed to the exterior of said panel, a timer switch in said hermetically sealed chamber, an angularly oscillating drive shaft means extending through said panel and connecting said timer switch operating means to said timer switch, and bushings surrounding said shafts and hermetically sealing relationship between said shafts and said panel.*

*87. A flow control according to claim 81 wherein said valve actuator means is housed in the interior of said frustoquadric main casing member; wherein said valve has a main housing attached to the exterior of said casing; and wherein said manually manipulatable connection means are attached to said main valve housing.*

*88. A flow control according to claim 87 wherein said valve comprises a cylindrical valve actuator stem sealed to said main housing of said valve, said valve actuator stem comprising means for opening said valve when said valve actuator means is energized and means for closing said valve when said valve actuator means is de-energized, said valve actuator stem protruding through said bottom cover into the interior of said main casing members; and wherein said valve actuator means comprises an electromagnetic coil telescoped over said valve actuator stem.*

*89. A flow control according to claim 87 wherein said main valve housing has an inlet and an outlet; wherein said manually manipulatable connection means comprises a fluid extension conduit, one extremity of which is attached to said fluid inlet; wherein said flow control also includes a fluid connector attached to the opposite end of said fluid extension conduit, said fluid connector being adapted to be affixed to the outlet of a faucet; and wherein the fluid outlet of said valve main housing is adapted to be connected to a flexible fluid conduit.*

*90. The flow control of claim 81 wherein said electrical conductor means comprises a cable extending in hermetically sealed relationship through said casing to said external electrical power source; one extremity of said cable being electrically connected to said valve operating means and the opposite extremity of said cable terminating in a plug having: a hermetically sealed casing, electrical contacts adapted to be plugged into a conventional electrical service outlet receptacle to thereby electrically connect said cable to said external electrical power source; and a step-down voltage circuit means housed in said plug casing and electrically connected between said contacts and said multiple-conductor cable for making a low operating voltage available to said valve operating means.*

*91. A flow control according to claim 81 which has a selectable program timer operating means and a three position mode control switch fixed on said panel for effecting automatic control of said fluid flow valve by said selectable program, timer operating means when said mode switch is in an automatic position and manual control of said valve when said mode switch is in a manual position and for disconnecting said valve actuator means from said valve actuator conductor means when said mode switch is in an off position, said mode control switch being accessible by displacement of said top cover relative to said main casing member.*

*92. A flow control according to claim 81 which includes a selectable program timer means for controlling the operation of said valve actuator means and a moisture sensitive rain switch for activating a time delay actuator means and thereby causing a relay means to override said selectable program timer means and cause said valve actuator means to open said valve at a predetermined time interval after activation of said rain switch; said rain switch having an insulating member with a surface which is adapted to be oriented to receive rain thereon and spaced apart conductor means on said surface which are adapted to be electrically connected by precipitation on said insulating surface to connect said external power source to said time delay actuator means; said moisture sensitive rain switch being disposed on the exterior surface of said frustoquadric top cover.*

*93. A flow control according to claim 92 together with a housing for said rain switch which comprises an upwardly opening main housing member spaced above said frustoquadric top cover and a perforate, protective cover spanning the open end of said main housing member, said rain switch being disposed at an angle to the horizontal in said housing, whereby rain can enter said housing through said protective cover, impinge on said rain switch, flow by gravity off the insulating surface thereof, and exit from said housing through the space between said main housing member and said top cover.*

*94. A flow control according to claim 93 wherein said rain switch housing is hinged to said top cover, thereby providing for variable selection of the angle formed between said top cover and the plane of the said rain switch housing; and wherein said control further includes means for securing said rain switch housing at any desired value of said angle.*

*95. A flow control according to claim 93 wherein said rain switch cable is formed into a contracted coil which has its peripheral plane orthogonal to the axis of said rain switch cable; said coil being located adjacent, and perpendicular, to a hinge axis at the juncture of said top cover and said panel, and the axis of said coil being perpendicular to said panel when the peripheral extremity of the said top cover is abutted with said panel, said coil thereby being so oriented as to be rotated relative to said panel and extended to protect it from flexure breakage when said top cover is opened and closed.*

*96. A flow control according to claim 92 which includes a rain switch cable extending from said spaced apart rain switch conductor means through said frustoquadric cover, radially along the interior surface of said frustoquadric cover, and through said panel to electrically connect said rain switch to said valve operating means; and means surrounding said cable for hermetically sealing the openings in said cover and said panel through which said cable passes.*

*97. A flow control for a fluid flow system, comprising: a casing having a cylindrical main casing member, a bottom cover fitted and fixed to said casing member at one end thereof, a panel affixed to and closing said main casing member at the opposite end thereof, said panel having a peripheral flange in contiguous abutment with the main casing member, and a top cover which is telescoped over said peripheral panel flange to form a closure between said top cover and the exterior of said panel, said bottom cover having a portion spanning said main casing member and a peripheral flange abutting the interior of said main casing member; a continuous annular gasket inserted contiguously between the peripheral extremities of said panel flange and said main casing member, the peripheral extremity of said panel flange being sandwiched circumferentially into one annular face of said annular gasket, and the opposite annular face thereof being telescoped over said peripheral extremity of said main casing member, thereby providing a seal between said top cover and said main casing member; a fluid flow valve disposed in said casing, said valve having an inlet and an outlet and an electrically operated actuator; conductor means extending from the interior to the exterior of said casing for electrically connecting said actuator to an external electrical power source; manually manipulatable connection means externally of said casing to which fluid supply and delivery means can be coupled; and means providing fluid communication from said connection means to the inlet and outlet of said fluid flow valve.*

*98. The flow control of claim 97 wherein said fluid communication means comprises: an inlet fitting between said fluid supply means and said valve inlet and an outlet fitting between said valve outlet and said fluid delivery means, said inlet and outlet fittings being in fluid communication with the inlet and outlet of said valve and having portions which extend through said casing to the exterior thereof; and wherein said control further comprises fastener means engaging said protruding portions of said fittings and the exterior side of said bottom cover for fixing said valve and said fittings in place in said casing.*

*99. A flow control according to claim 97 comprising means for supporting said flow control casing from one extremity of a vertical, stanchion which includes a downwardly opening female cap attached to said bottom cover and adapted to be telescoped over said one extremity of said vertical stanchion.*

*100. A flow control according to claim 97 which includes a moisture sensitive rain switch for activating a time delay actuator means and thereby causing a relay means to override said external electrical power and cause said valve actuator to open said valve at a predetermined time interval after activation of said rain switch; said rain switch having an insulating member with a surface which is adapted to be oriented to receive rain thereon and spaced apart conductor means on said surface which are adapted to be electrically connected by precipitation on said insulating surface to connect said external power source to said time delay actuator means; said moisture sensitive rain switch being disposed on the exterior surface of said top cover.*

*101. A flow control according to claim 100 together with a housing for said rain switch which comprises an upwardly opening main housing member spaced above said frustoquadric top cover and a perforate, protective cover spanning the open end of said main housing member, said rain switch being disposed at an angle to the horizontal in said housing, whereby rain can enter said housing through said protective cover, impinge on said rain switch, flow by gravity off the insulating surface thereof, and exit from said housing through the space between said main housing member and said top cover.*

*102. A flow control for a fluid flow system, comprising: a casing having a cylindrical main casing member, a bottom cover fitted and fixed to said casing member at one end thereof, a panel affixed to and closing said main casing member at the opposite end thereof, said panel having a peripheral flange in contiguous circumferential abutment with the main casing member, thereby providing a seal between said panel and said main casing member, and a top cover which is telescoped over said peripheral panel flange to form a closure between said top cover and the exterior of said panel, said bottom cover having a flat portion spanning said main casing member and a peripheral flange abutting said main casing member; a fluid flow valve disposed in said casing, said valve having an inlet and an outlet and an electrically operated actuator; conductor means extending from the interior to the exterior of said casing for electrically connecting said actuator to an external electrical power source; manually manipulatable connection means externally of said casing to which fluid supply and delivery means can be coupled; means providing fluid communication from said connection means to the inlet and outlet of said fluid flow valve; and means for supporting said flow control casing from one extremity of a vertical stanchion which includes a downwardly opening female cap attached to said bottom cover and adapted to be telescoped over said one extremity of said vertical stanchion, there being communicating openings in said bottom cover and at said extremity of said stanchion through which said conductor means can be introduced into said casing.*

* * * * *